US012050410B2

(12) United States Patent
Ishida

(10) Patent No.: US 12,050,410 B2
(45) Date of Patent: Jul. 30, 2024

(54) IMAGE FORMING APPARATUS

(71) Applicant: KYOCERA Document Solutions Inc., Osaka (JP)

(72) Inventor: Hideki Ishida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 81 days.

(21) Appl. No.: 17/952,910

(22) Filed: Sep. 26, 2022

(65) Prior Publication Data

US 2023/0097828 A1 Mar. 30, 2023

(30) Foreign Application Priority Data

Sep. 28, 2021 (JP) ................................ 2021-158115

(51) Int. Cl.
*G03G 15/043* (2006.01)
*G03G 15/00* (2006.01)

(52) U.S. Cl.
CPC ....... *G03G 15/043* (2013.01); *G03G 15/5058* (2013.01); *G03G 15/5062* (2013.01)

(58) Field of Classification Search
CPC ............. G03G 15/043; G03G 15/5054; G03G 15/5058; G03G 15/5062
See application file for complete search history.

(56) References Cited

U.S. PATENT DOCUMENTS

2002/0063770 A1 5/2002 Takesue ........................ 347/234
2004/0075877 A1 4/2004 Takesue ........................ 358/520
2005/0093969 A1 5/2005 Takesue ........................ 347/240
2007/0115339 A1* 5/2007 Matsuzaki ......... G03G 15/0194 347/118
2013/0286132 A1* 10/2013 Yamazaki ........... G03G 15/043 347/118
2014/0036020 A1* 2/2014 Ishihara ............. G03G 15/0435 347/224
2015/0117885 A1* 4/2015 Shirafuji ................ G03G 21/20 399/49
2023/0096091 A1* 3/2023 Ishida ................ G03G 15/5062 399/51
2023/0097732 A1* 3/2023 Ishida ................ G03G 15/5062 399/72
2023/0103182 A1* 3/2023 Ishida ................ G03G 15/5058 399/49

FOREIGN PATENT DOCUMENTS

JP 2002-137447 A 5/2002

* cited by examiner

*Primary Examiner* — Carla J Therrien
(74) *Attorney, Agent, or Firm* — Stein IP LLC

(57) ABSTRACT

An image forming apparatus includes a light scanning device, a developing portion, a control portion and a storage portion. The storage portion stores an evaluation chart. The evaluation chart includes a first evaluation pattern and a second evaluation pattern. The first evaluation pattern includes a first patch row. The first patch row is formed by arranging a plurality of first evaluation patches. The first evaluation patch includes a first dot row and a second dot row. The second evaluation pattern includes a second patch row. The second patch row is formed by arranging a plurality of second evaluation patches.

12 Claims, 21 Drawing Sheets

IMAGE FORMING APPARATUS

INCORPORATION BY REFERENCE

This application is based upon and claims the benefit of priority from the corresponding Japanese Patent Application No. 2021-158115 filed on Sep. 28, 2021, the entire contents of which are incorporated herein by reference.

BACKGROUND

The present disclosure relates to electrophotographic image forming apparatuses.

Conventionally, an electrophotographic image forming apparatus is required to increase the speed of image output and achieve a higher resolution. For these requirements, an image forming apparatus is known which adopts a multi-beam method of scanning light beams over a photoconductive drum from a multi-beam laser having a plurality of light emitters.

The image forming apparatus as described above includes a main body portion and the multi-beam laser having a plurality of light emitters which are arranged linearly at a tip of the main body portion. The image forming apparatus draws dots with light beams emitted from the light emitters to form an image with the dots. Intervals between the dots in the main scanning direction of the light beam can be adjusted by changing timing at which the light beam is emitted (timing at which each light-emitting portion is lit). Intervals between the dots in the subscanning direction (direction perpendicular to the main scanning direction) of the light beam can be adjusted by changing the rotation angle of the main body portion. Ideal timing at which the light beam is emitted is previously stored in a storage portion provided in the image forming apparatus.

Incidentally, in a conventional general image forming apparatus, dots may be displaced in a main scanning direction to cause unevenness in density or changes in density due to development characteristics, jitter produced by vibrations or the like in a conveying system such as a transfer belt or the like. To cope with this problem, the image forming apparatus as described above forms a plurality of predetermined evaluation charts, compares density differences in the evaluation charts and thereby can detect the dot displacement described above. The control portion of the image forming apparatus changes, for the detected dot displacement, timing at which each light-emitting portion emits light, and thereby can eliminate the dot displacement.

In the evaluation chart, a plurality of evaluation patches formed by dots are arranged at predetermined intervals in the main scanning direction and in the subscanning direction. The evaluation patch is formed with a first dot row and a second dot row which are linear rows of dots arranged continuously in the main scanning direction. In the first dot row and the second dot row, the number of dots in the subscanning direction is one. The second dot row is continuously connected to the downstream side of the first dot row in the subscanning direction, and is arranged to be displaced with respect to the first dot row to a downstream side in the main scanning direction.

If a dot displacement occurs in the main scanning direction, the area of a part in which the first dot row and the second dot row overlap each other in the main scanning direction is changed. Hence, an image density in the evaluation chart is changed. The timing at which each light-emitting portion emits light is adjusted according to the amount of change thereof. Correction values for the light emission timing corresponding to the image data of the evaluation chart and the size of the dot displacement are previously stored in the storage portion of the control portion.

SUMMARY

An image forming apparatus according to one aspect of the present disclosure includes a light scanning device, a developing portion, a control portion and a storage portion. The light scanning device includes: a light source including three or more light-emitting portions which are arranged at a predetermined angle with respect to a main scanning direction in a row at regular intervals; and a polygon mirror which deflects and scans light beams emitted from the light-emitting portions, and uses the light beams to form an electrostatic latent image on an image carrying member. The developing portion forms a toner image by visualizing the electrostatic latent image. The control portion controls the light scanning device such that turning on and off of each of the light-emitting portions are switched to form the electrostatic latent image corresponding to image data. The storage portion stores a predetermined evaluation chart which is formed by dots drawn with the light beams of the light-emitting portions to determine timing at which each of the light-emitting portions starts writing. The evaluation chart includes: a first evaluation pattern; and a second evaluation pattern that is arranged parallel to the first evaluation pattern in the main scanning direction or a subscanning direction perpendicular to the main scanning direction. The first evaluation pattern includes a first patch row that is formed by arranging a plurality of first evaluation patches at equal intervals in the subscanning direction, the first evaluation patch includes: a first dot row in which a smaller number of dots in the subscanning direction than a number of the light-emitting portions are arranged linearly and continuously in the main scanning direction; and a second dot row in which a number of dots adjacent to the first dot row in the subscanning direction are arranged linearly and continuously in the main scanning direction so as to be displaced with respect to the first dot row, the number being equal to or less than a number obtained by subtracting the number of dots of the first dot row in the subscanning direction from the number of the light-emitting portions and a plurality of the first patch rows are arranged at predetermined equal intervals in the main scanning direction to form the first evaluation pattern. The second evaluation pattern includes a second patch row that is formed by arranging, in the subscanning direction, a plurality of second evaluation patches at same intervals as the intervals at which the first evaluation patches are arranged parallel to each other, the second evaluation patch is symmetrical with the first evaluation patch in a direction in which the first evaluation pattern and the second evaluation pattern are arranged parallel to each other and a plurality of the second patch rows are arranged at predetermined equal intervals in the main scanning direction to form the second evaluation pattern.

DETAILED DESCRIPTION

Figure 1:
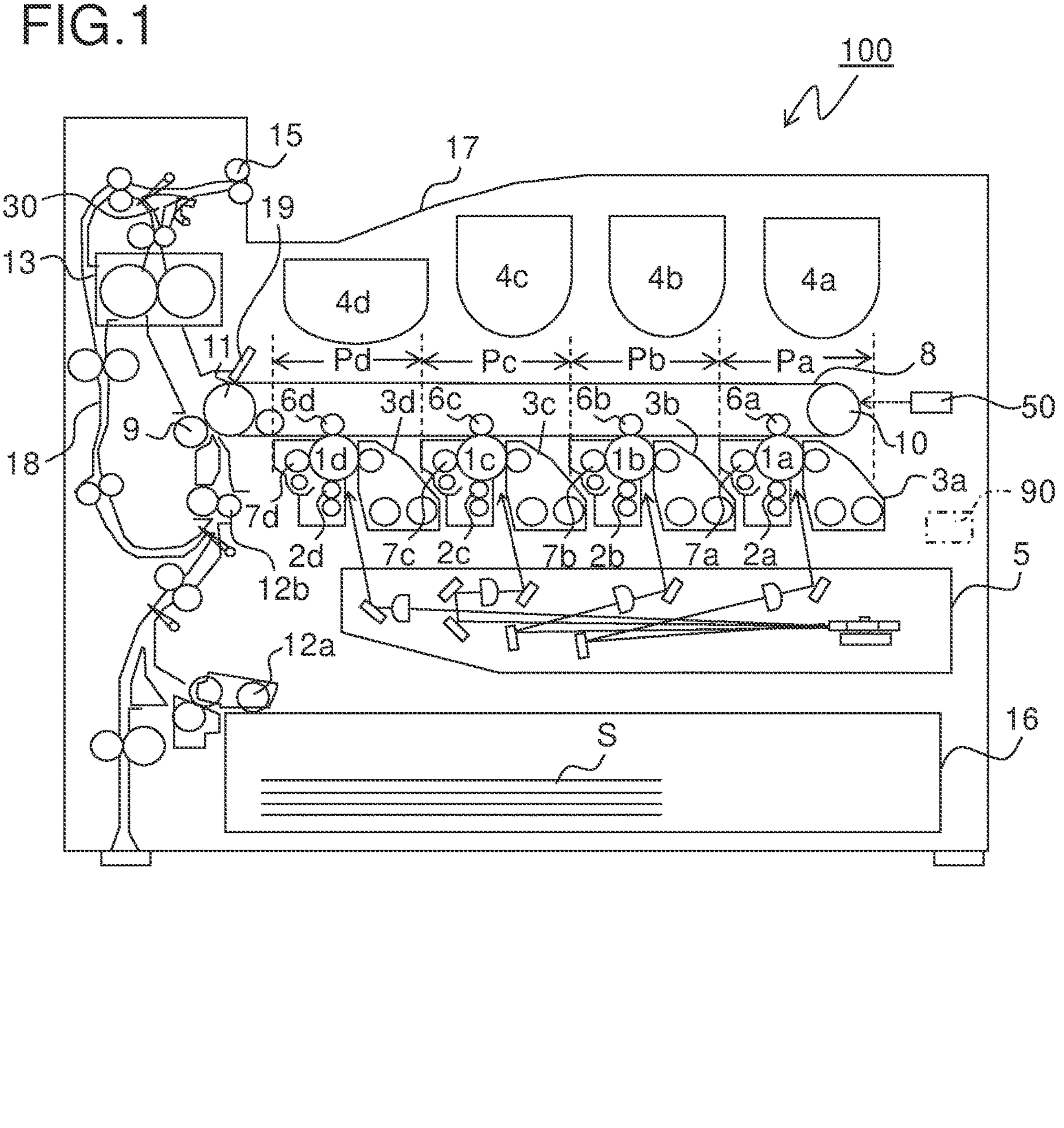
FIG. 1 is a schematic cross-sectional view showing the internal structure of an image forming apparatus according to the first embodiment of the present disclosure.

Embodiments of the present disclosure will be described below with reference to drawings. FIG. 1 is a schematic cross-sectional view showing the internal structure of an image forming apparatus 100 according to an embodiment of the present disclosure. In the main body of the image forming apparatus 100 (here, a color printer), four image forming portions Pa, Pb, Pc and Pd are provided sequentially from an upstream side in a conveying direction (a right side in FIG. 1). The image forming portions Pa to Pd are provided to correspond to images of different four colors (cyan, magenta, yellow and black), and sequentially form the images of cyan, magenta, yellow and black in the steps of charging, exposure, development and transfer.

In the image forming portions Pa to Pd, photoconductive drums 1*a*, 1*b*, 1*c* and 1*d* are provided which carry visual images (toner images) of the colors. Furthermore, an intermediate transfer belt 8 which is rotated in a clockwise direction in FIG. 1 is provided adjacent to the image forming portions Pa to Pd. The toner images formed on the photoconductive drums 1*a* to 1*d* are primarily transferred sequentially on the intermediate transfer belt 8 being moved in contact with the photoconductive drums 1*a* to 1*d* so as to be superimposed on each other. Thereafter, the toner images primarily transferred on the intermediate transfer belt 8 are secondarily transferred with a secondary transfer roller 9 on a sheet S (recording medium) serving as an example of a recording medium. Furthermore, after the toner images are fixed in a fixing device 13, the sheet S on which the toner images have been secondarily transferred is ejected from the main body of the image forming apparatus 100. While the photoconductive drums 1*a* to *d* are being rotated by a main motor 40 (see FIG. 4) in a counterclockwise direction in FIG. 1, an image formation process is performed on the photoconductive drums 1*a* to 1*d*.

The sheets S on which the toner images are secondarily transferred are stored in a sheet cassette 16 arranged in a lower portion of the main body of the image forming apparatus 100, and are conveyed through a paper feed roller 12*a* and a registration roller pair 12*b* to a nip portion between the secondary transfer roller 9 and the drive roller 11 of the intermediate transfer belt 8. As the intermediate transfer belt 8, a sheet formed of a dielectric resin is used, and a seamless belt is mainly used. A blade-shaped belt cleaner 19 for removing the toners and the like left on the surface of the intermediate transfer belt 8 is arranged on the downstream side of the secondary transfer roller 9.

The image forming portions Pa to Pd will then be described. Charging devices 2*a*, 2*b*, 2*c* and 2*d* for charging the photoconductive drums 1*a* to 1*d*, a light scanning device 5 for exposing image information to the photoconductive drums 1*a* to 1*d*, developing devices 3*a*, 3*b*, 3*c* and 3*d* for forming the toner images on the photoconductive drums 1*a* to 1*d*, cleaning devices 7*a*, 7*b*, 7*c* and 7*d* for removing developers (toners) and the like left on the photoconductive drums 1*a* to 1*d* and an image density sensor 50 (density detection mechanism) capable of detecting the densities of the toner images primarily transferred on the intermediate transfer belt 8 are provided around and below the photoconductive drums 1*a* to 1*d* which are rotatably provided.

When image data is input from a high-level device such as a personal computer, the charging devices 2*a* to 2*d* first uniformly charge the surfaces of the photoconductive drums 1*a* to 1*d*. Then, the light scanning device 5 applies light according to the image data to form electrostatic latent images corresponding to the image data on the photoconductive drums 1*a* to 1*d*. The developing devices 3*a* to 3*d* are respectively filled with predetermined amounts of two-component developers including the toners of the colors of cyan, magenta, yellow and black. When the ratios of the toners in the two-component developers filled in the developing devices 3*a* to 3*d* fall below specified values by the formation of the toner image to be described later, the developing devices 3*a* to 3*d* are replenished with the toners from toner containers 4*a* to 4*d*. The toners in the developers are supplied by the developing devices 3*a* to 3*d* on the photoconductive drums 1*a* to 1*d* and are electrostatically adhered thereon. In this way, toner images corresponding to the electrostatic latent images formed by exposure from the light scanning device 5 are formed.

Then, by primary transfer rollers 6*a* to 6*d*, an electric field is applied at a predetermined transfer voltage between the primary transfer rollers 6*a* to 6*d* and the photoconductive drums 1*a* to 1*d*, and thus the toner images of cyan, magenta, yellow and black on the photoconductive drums 1*a* to 1*d* are primarily transferred on the intermediate transfer belt 8. The images of the four colors are formed with a predetermined positional relationship in order to form a predetermined full-color image. Thereafter, in preparation for the subsequent formation of new electrostatic latent images, the toners and the like left on the surfaces of the photoconductive drums 1*a* to 1*d* after the primary transfer are removed by the cleaning devices 7*a* to 7*d*.

The intermediate transfer belt 8 is placed over a driven roller 10 on an upstream side and a drive roller 11 on a downstream side, and when the intermediate transfer belt 8 starts to be rotated in the clockwise direction as the drive roller 11 is rotated by a belt drive motor 51 (see FIG. 4), the sheet S is conveyed with predetermined timing from the registration roller pair 12*b* to the nip portion (secondary transfer nip portion) between the drive roller 11 and the secondary transfer roller 9 provided adjacent thereto, and the full-color image on the intermediate transfer belt 8 is secondarily transferred on the sheet S. The sheet S on which the toner images have been secondarily transferred is conveyed to the fixing device 13.

The image density sensor 50 is arranged opposite the driven roller 10 through the intermediate transfer belt 8. The image density sensor 50 is, for example, a specular reflection-type sensor which detects reflected light. The image density sensor 50 includes: an LED light source which is arranged to be inclined at a predetermined angle with respect to a detection position on the surface of the intermediate transfer belt 8; a phototransistor serving as a light-receiving element; and the like (not shown). The LED light source applies light to the toner images on the intermediate transfer belt 8, the amount of reflected light is detected by the phototransistor and thus the optical densities (hereinafter simply referred to as "image densities") of the toner images are measured. The image density sensor 50 converts the results of the measurement into electrical signals and outputs them to a control portion 90 which will be described later. The image density sensor 50 is preferably a sensor which can detect the density information of the toner images, and may be, for example, a sensor which can detect a density from an image acquired by imaging the toner images.

The sheet S which has been conveyed to the fixing device 13 is heated and pressurized with a fixing belt 21 (first fixing member) and a pressure roller 22 (second fixing member) such that the toner images are fixed on the surface of the sheet S, and thus the predetermined full-color image is formed. For the sheet S on which the full-color image has been formed, the conveying direction is distributed by a branch portion 30 which branches in a plurality of directions, and the sheet S is ejected by an ejection roller pair 15 to an ejection tray 17 without being processed (or after the sheet S is fed to a double-sided conveyance path 18 and images are formed on both the surfaces thereof).

Figure 2:
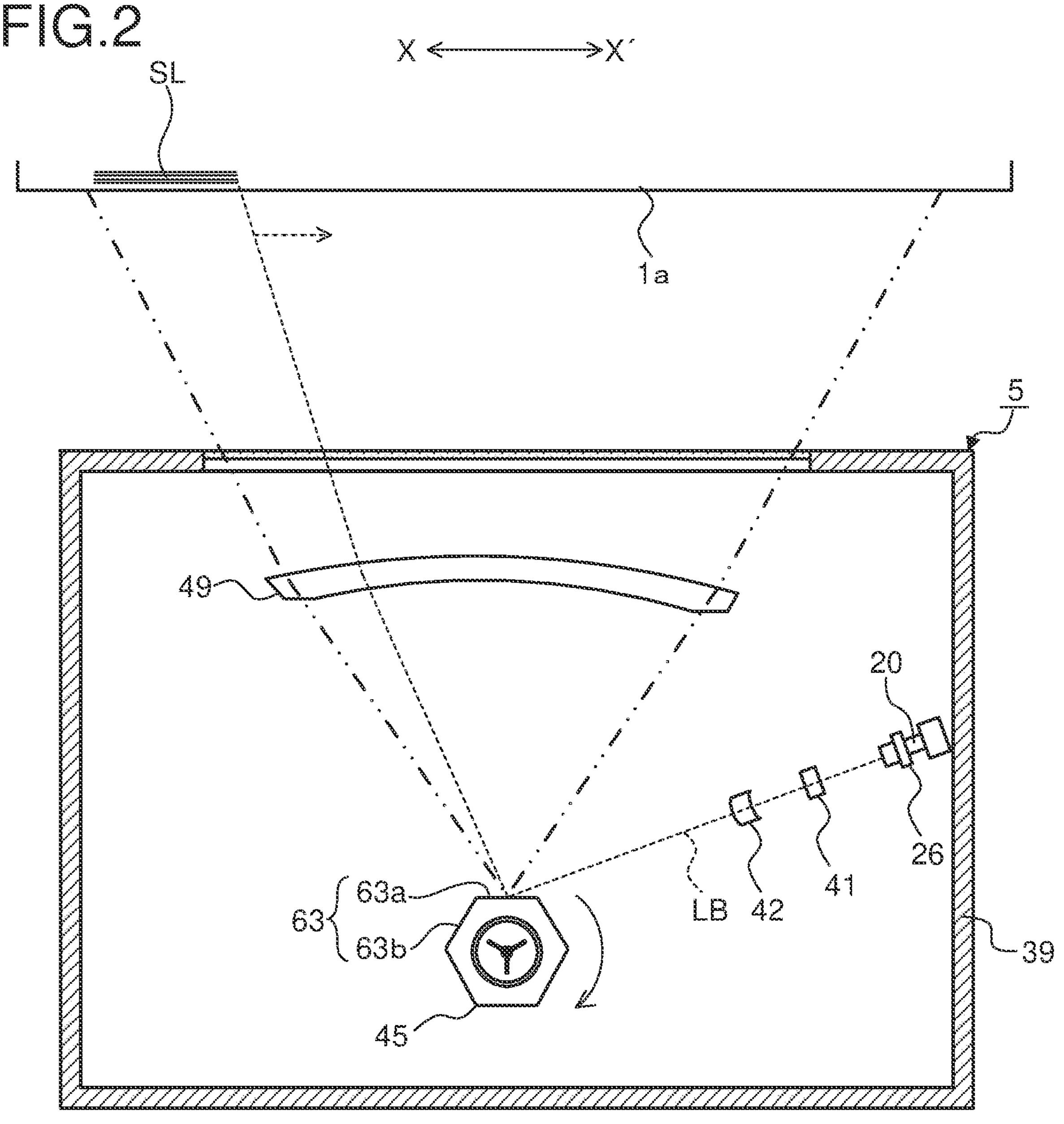
FIG. 2 is a plan cross-sectional view schematically showing the configuration of a light scanning device.
Figure 3:
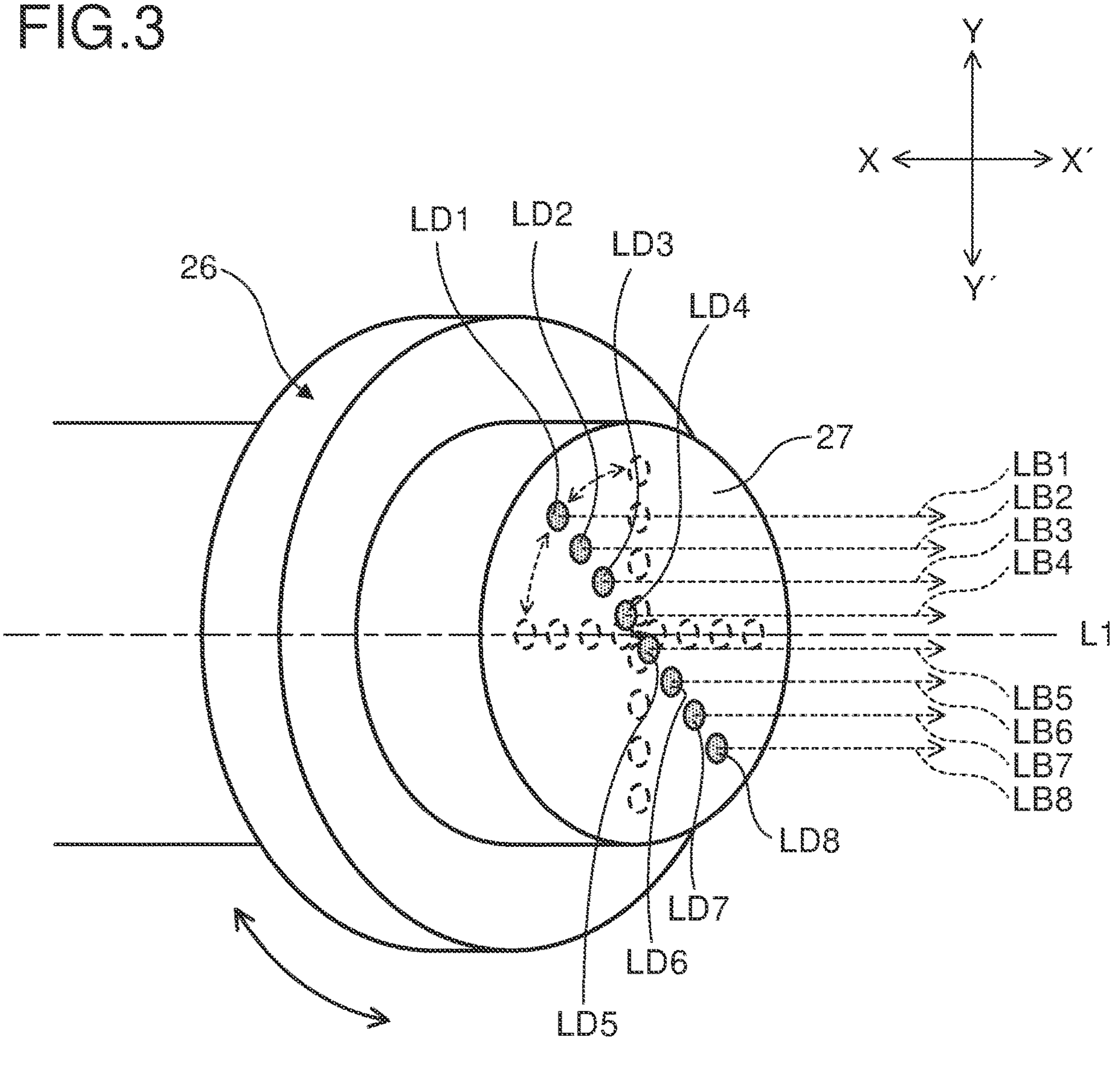
FIG. 3 is a perspective view showing a light source unit.

The light scanning device 5 in the first embodiment of the present disclosure will then be described in detail with reference to FIGS. 2 and 3. FIG. 2 is a plan cross-sectional view schematically showing the configuration of the light scanning device 5. FIG. 3 is a perspective view showing a light source unit 26. Although the light scanning device 5 scans light over the photoconductive drums 1*a* to 1*d*, a description will be given here of only light scanning over the photoconductive drum 1*a* with the omission of a description for the other photoconductive drums.

As shown in FIG. 2, the light scanning device 5 includes an enclosure 39, the light source unit 26 housed in the enclosure 39, a collimator lens 41, a cylindrical lens 42, a polygon mirror 45 and a scanning lens 49.

As shown in FIGS. 2 and 3, the light source unit 26 (light source) includes a tip surface 27, laser diodes LD1 to LD8 (light emitters) and a beam generating portion 20. The tip surface 27 in the longitudinal direction of the light source unit 26 is a circular flat surface. The light source unit 26 is rotated in a circumferential direction while an axis line (central axis L1) of a normal to the tip surface 27 which passes through the center of the tip surface 27 is set to a rotation axis, and thus intervals between the laser diodes LD1 to LD8 in a subscanning direction are adjusted and fixed.

The laser diodes LD1 to LD8 are arranged linearly along the radial direction of the light source unit 26 at equal intervals. The beam generating portion 20 generates, based on image information transmitted from the control portion 90 to be described later, light beams LB (hereinafter also individually referred to as light beams LB1 to LB8) emitted separately from the laser diodes LD1 to LD8.

When the rotation of the light source unit 26 is adjusted so that the intervals between the laser diodes LD1 to LD8 in the subscanning direction are adjusted, intervals between the laser diodes LD1 to LD8 in a main scanning direction are changed. In a state where the laser diodes LD1 to LD8 are aligned linearly parallel to the subscanning direction (up/down direction shown in FIG. 3), the intervals between the laser diodes LD1 to LD8 in the main scanning direction are minimized. By contrast, in a state where the laser diodes LD1 to LD8 are aligned linearly parallel to the main scanning direction (left/right direction shown in FIG. 3), the intervals between the laser diodes LD1 to LD8 in the main scanning direction are maximized (see, for both the states, portions indicated by broken lines in FIG. 3).

The collimator lens 41 changes the light beams LB emitted from the light source unit 26 into a substantially parallel light flux (parallel light flux). The cylindrical lens 42 has a predetermined refractive power only in the subscanning direction of the light beams LB. The light source unit 26, the collimator lens 41 and the cylindrical lens 42 are arranged linearly.

The polygon mirror 45 is a regular polygonal prism (here, a regular hexagonal prism) in which a deflection surface 63 is formed in each side surface. The deflection surfaces 63 are mirror surfaces, and can reflect the light beams LB emitted from the light source unit 26 to deflect them. The polygon mirror 45 is supported to be able to rotate about a central axis (not shown) extending along the up/down direction (direction of the plane of FIG. 2). The polygon mirror 45 is connected to a polygon motor (not shown) and is rotated by the rotational drive force of the polygon motor.

The scanning lens 49 is a lens which has fθ characteristics. The scanning lens 49 is arranged between the photoconductive drum 1*a* and the polygon mirror 45. The light beams LB emitted from the light source unit 26 enter the collimator lens 41 and the cylindrical lens 42 in this order so as to form, as a diagram, an image on the deflection surface 63. The light beams LB which form the image on the deflection surface 63 are reflected and are passed through the scanning lens 49 to form, on the photoconductive drum 1*a*, an image having a spot diameter of a predetermined size.

The polygon mirror 45 is rotated by the polygon motor at a constant speed in a clockwise direction shown in FIG. 2. Hence, the light beams LB are scanned at a constant speed on the scanned surface of the photoconductive drum 1*a* in the main scanning direction (direction indicated by an arrow X' in the figure). In this way, on the scanned surface of the photoconductive drum 1*a*, a scanning line SL extending linearly in the main scanning direction is formed. When one laser diode is provided in the light source unit, one scanning line SL is drawn for one deflection surface 63. When a plurality of laser diodes are provided in the light source unit, a plurality of scanning lines SL are drawn for one deflection surface 63. By the rotation of the polygon mirror 45, images are sequentially formed with the light beams LB on the adjacent deflection surfaces 63. Since the photoconductive drum 1*a* is rotated, a plurality of scanning lines SL are formed in the subscanning direction to form electrostatic latent images.

Figure 4:
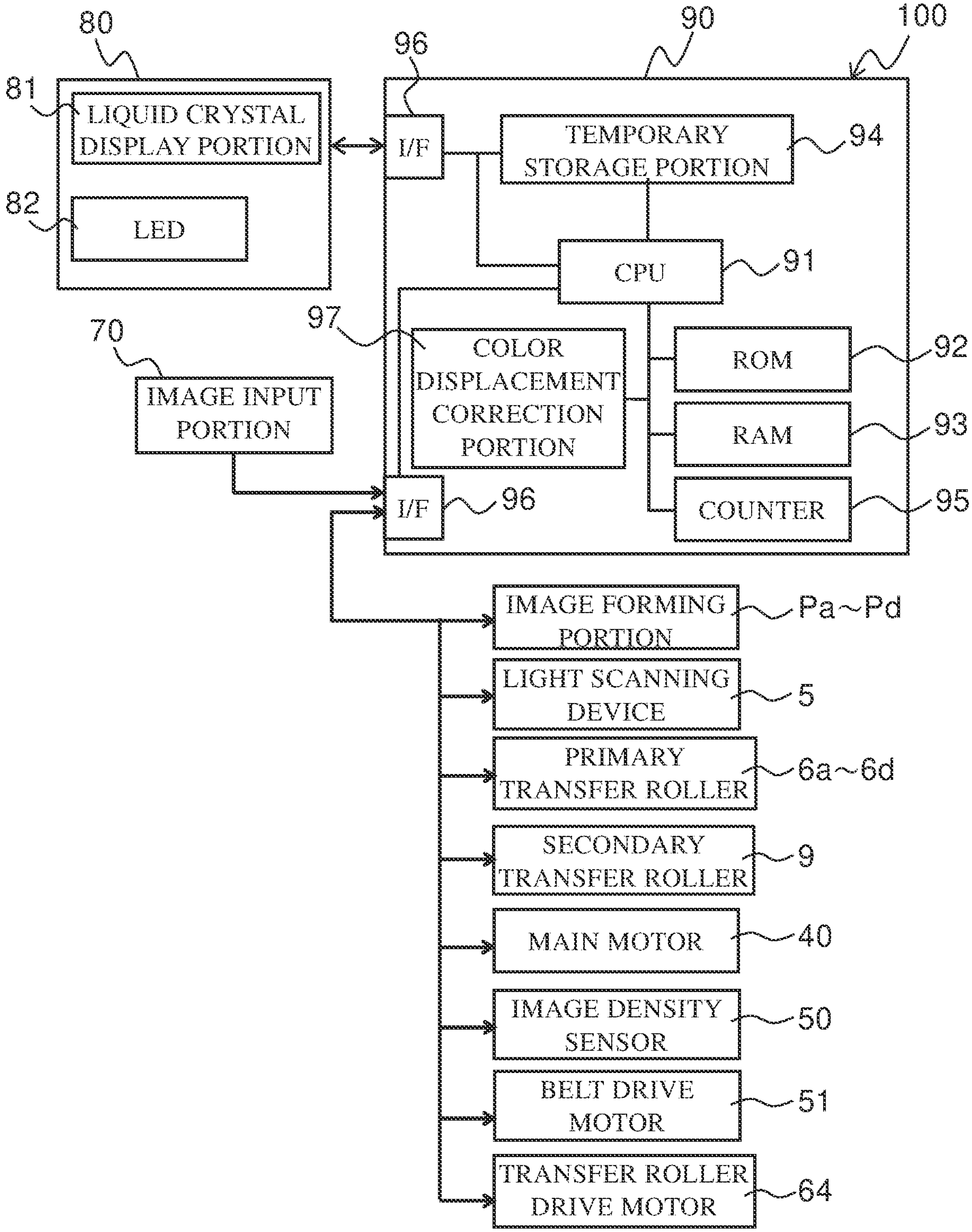
FIG. 4 is a block diagram showing an example of a control path in the image forming apparatus of the first embodiment.

FIG. 4 is a block diagram showing an example of a control path in the image forming apparatus 100 of the present embodiment. Since various types of control are performed on the portions of the apparatus in the use of the image forming apparatus 100, the control path of the entire image forming apparatus 100 is complicated. Hence, here, a part of the control path which is necessary for implementing the present disclosure will be mainly described.

The control portion 90 includes a CPU (Central Processing Unit) 91, a ROM (Read Only Memory) 92 (storage portion), a RAM (Random Access Memory) 93, a temporary storage portion 94, a counter 95, an I/F (interface) 96 and a color displacement correction portion 97. The CPU 91 plays a role as a central processing unit. The ROM 92 is a read-only storage portion. The RAM 93 is a readable/writable storage portion. The temporary storage portion 94 temporarily stores the image data and the like. The counter 95 accumulates and counts the number of sheets printed. The I/F 96 transmits control signals to devices in the image forming apparatus 100 and receives input signals from an operation portion 80. A plurality of I/Fs 96 (here, two) are provided. The color displacement correction portion 97 corrects a displacement in the electrostatic latent images drawn on the photoconductive drum 1*a* to perform a color displacement amendment for an output image. The control portion 90 can be arranged in any location in the main body of the image forming apparatus 100.

In the ROM 92, data and the like, such as control programs for the image forming apparatus 100 and necessary values for control, which are not changed during the use of the image forming apparatus 100 are stored. In the ROM 92, evaluation charts CT (image data used for calibration) for performing the color displacement correction (calibration) are stored. In the RAM 93, necessary data generated during control of the image forming apparatus 100, data temporarily required for controlling the image forming apparatus 100 and the like are stored. In the RAM 93 (or the ROM 92), a density correction table used for the color displacement correction and the like are also stored.

The control portion 90 transmits the control signals to the portions and the devices in the image forming apparatus 100 from the CPU 91 through the I/Fs 96. Signals indicating states and the input signals are transmitted from the portions and the devices to the CPU 91 through the I/Fs 96. Examples of the portions and the devices controlled by the control portion 90 include the image forming portions Pa to Pd, the light scanning device 5, the primary transfer rollers 6*a* to 6*d*, the secondary transfer roller 9, the main motor 40, the image density sensor 50, the belt drive motor 51, a transfer roller drive motor 64, an image input portion 70, a voltage control circuit 71, the operation portion 80 and the like.

The image density sensor 50 emits measurement light from a light-emitting element to the evaluation chart CT formed on the intermediate transfer belt 8, and measures the intensity and the like of the measurement light (including light reflected off the toners and light reflected off the surface of the belt) which is reflected to enter light-receiving elements.

The light reflected off the toners and the surface of the belt includes specular reflected light and diffused reflected light. The specular reflected light and the diffused reflected light are separated with a polarization separation prism to enter the separate light-receiving elements. The light-receiving elements photoelectrically convert the specular reflected light and the diffused reflected light which have been received, and output output signals to the control portion 90 (the color displacement correction portion 97).

The color displacement correction portion 97 determines the image density (the amount of toner) and an image position in the evaluation chart CT from the results of the detection by the image density sensor 50 (characteristic changes in the output signals of the specular reflected light and the diffused reflected light). The color displacement correction portion 97 compares the results of the determination with a reference density and a reference position previously stored in the ROM 92 to adjust the characteristic value of a development voltage, timing at which the laser diodes LD1 to LD8 emit light and the like, and thereby corrects the positions of dots DT1 to DT8 (see FIG. 5) drawn by the light beams LB1 to LB8, with the result that the density correction and the color displacement correction for the colors are performed. Hereinafter, the dots which are respectively drawn by the light beams LB1 to LB8 are referred to as the "dots DT1 to DT8".

The color displacement correction portion 97 determines, from the results of the determination of the image density in the evaluation chart CT, whether or not the dots DT1 to DT8 are displaced (whether or not a dot displacement occurs). When the dot displacement occurs, a dot displacement correction value is calculated based on the results of the determination of the image density in the evaluation chart CT. The control portion 90 adjusts, based on the dot displacement correction value, the timing at which the laser diodes LD1 to LD8 emit light (the amount of displacement of timing at which the light beams LB1 to LB8 are emitted). In this way, the positions of the dots DT1 to DT8 in the main scanning direction are adjusted, and thus it is possible to correct the dot displacement.

The image input portion 70 is a reception portion which receives the image data transmitted from the high-level device such as a personal computer to the image forming apparatus 100. Image signals input by the image input portion 70 are converted into digital signals, and thereafter, the digital signals are sent to the temporary storage portion 94.

In the operation portion 80, a liquid crystal display portion 81 and LEDs 82 which indicate various types of states are provided. A user operates a stop/clear button in the operation portion 80 to stop the image formation, and operates a reset button to bring various types of settings in the image forming apparatus 100 into a default state. The liquid crystal display portion 81 indicates the state of the image forming apparatus 100, and displays the status of the image formation and the number of sheets printed. The various types of settings in the image forming apparatus 100 are made from a printer driver.

Figure 5:
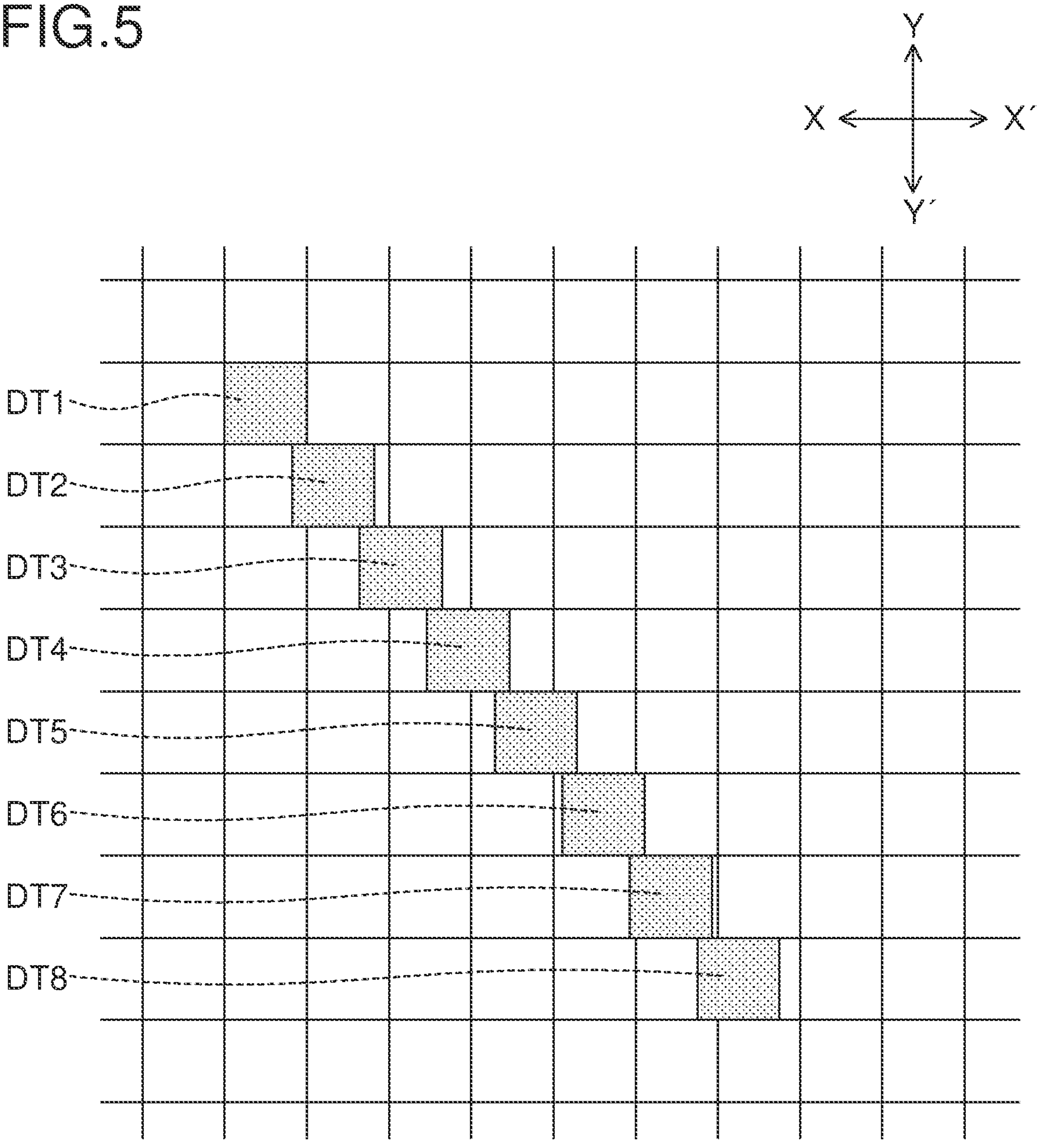
FIG. 5 is a diagram showing the start of writing of dots formed as an image on a photoconductive drum when all laser diodes are simultaneously lit and all light beams are emitted.
Figure 6:
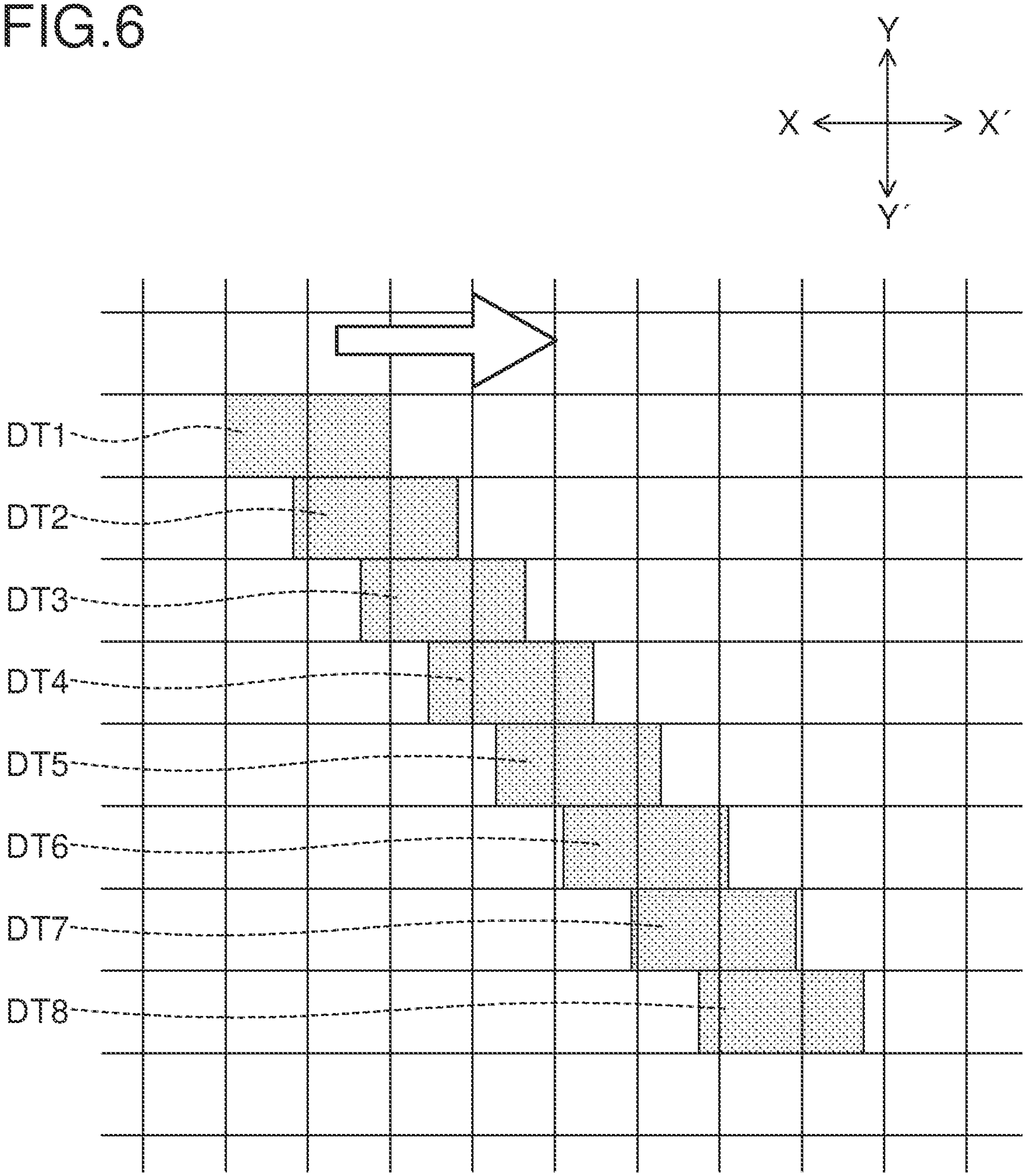
FIG. 6 is a diagram showing a state where the light beams are scanned in a main scanning direction from the state of FIG. 5.
Figure 7:
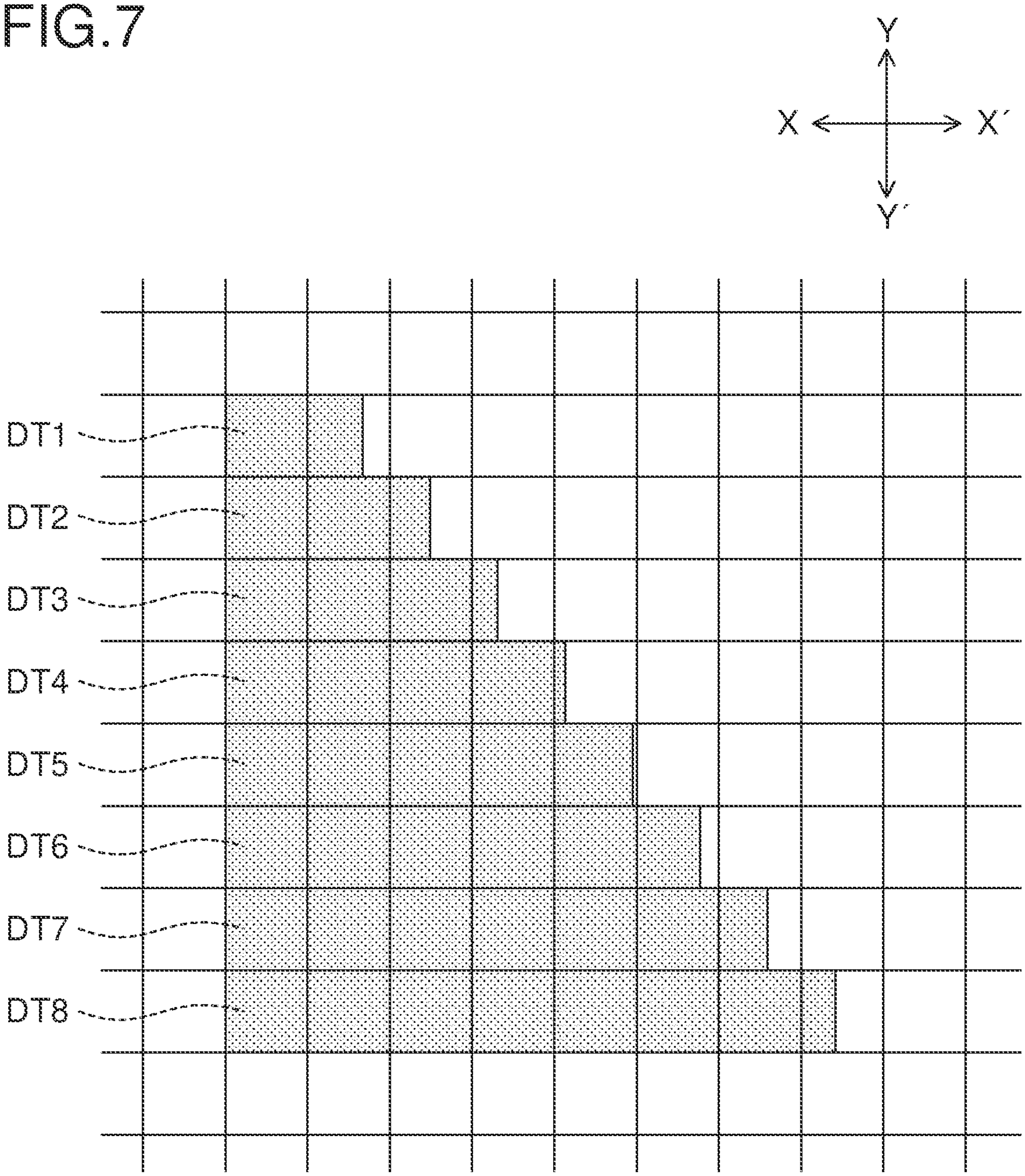
FIG. 7 is a diagram showing an electrostatic latent image in a state where timing at which the laser diodes emit light is adjusted such that the writing start positions of the dots are the same position in the main scanning direction.

FIG. 5 is a diagram showing the start of writing of the dots DT1 to DT8 formed as an image on the photoconductive drum 1*a* when all the laser diodes LD1 to LD8 are simultaneously lit to emit all the light beams LB1 to LB8. FIG. 6 is a diagram showing a state where the light beams LB1 to LB8 are scanned in the main scanning direction from the state of FIG. 5. FIG. 7 is a diagram showing an electrostatic latent image in a state where the timing at which the laser diodes LD1 to LD8 emit light is adjusted such that the writing start positions of the dots DT1 to DT8 are the same position in the main scanning direction.

The light beams LB1 to LB8 draw the dots DT1 to DT8 on the scanned surface of the photoconductive drum 1*a* (see FIG. 5). When all the laser diodes LD1 to LD8 are made to emit light with the same timing from the light source unit 26 at a predetermined rotation angle so as to emit the light beams LB1 to LB8, as shown in FIG. 5, a straight line (a row of the dots DT1 to DT8) which is inclined with respect to the subscanning direction is drawn on the scanned surface. When in this state, the light beams LB1 to LB8 are scanned on the scanned surface of the photoconductive drum 1*a* in the main scanning direction by the rotation of the polygon mirror 45, as shown in FIG. 6, an electrostatic latent image in a state where writing start portions are inclined with respect to the subscanning direction is drawn.

In order to align the writing start positions of the electrostatic latent image in the main scanning direction, the color displacement correction portion 97 controls the timing at which the laser diodes LD1 to LD8 emit light. For example, in order to draw the electrostatic latent image in which the writing start positions of the light beams LB1 to LB8 are the same position in the main scanning direction, the timing at which the laser diodes LD1 to LD8 emit light is set such that the writing is started sequentially from the dot most displaced to the downstream side in the main scanning direction among the dots DT1 to DT8, that is, that the laser diodes LD8, LD7, LD6, LD5, LD4, LD3, LD2 and LD1 are made to emit light in this order, with the result that the light beams LB1 to LB8 are emitted.

By contrast, in order to align writing end portions in the main scanning direction, timing at which the laser diodes LD1 to LD8 are turned off is set to the same order described above (here, in the order of LD8, LD7, LD6, LD5, LD4, LD3, LD2 and LD1) (not shown). The color displacement correction portion 97 calculates, from the image density in the evaluation chart CT detected by the image density sensor 50, timing at which the laser diodes LD1 to LD8 are turned on and off, and outputs output signals to the light source unit 26.

Figure 8:
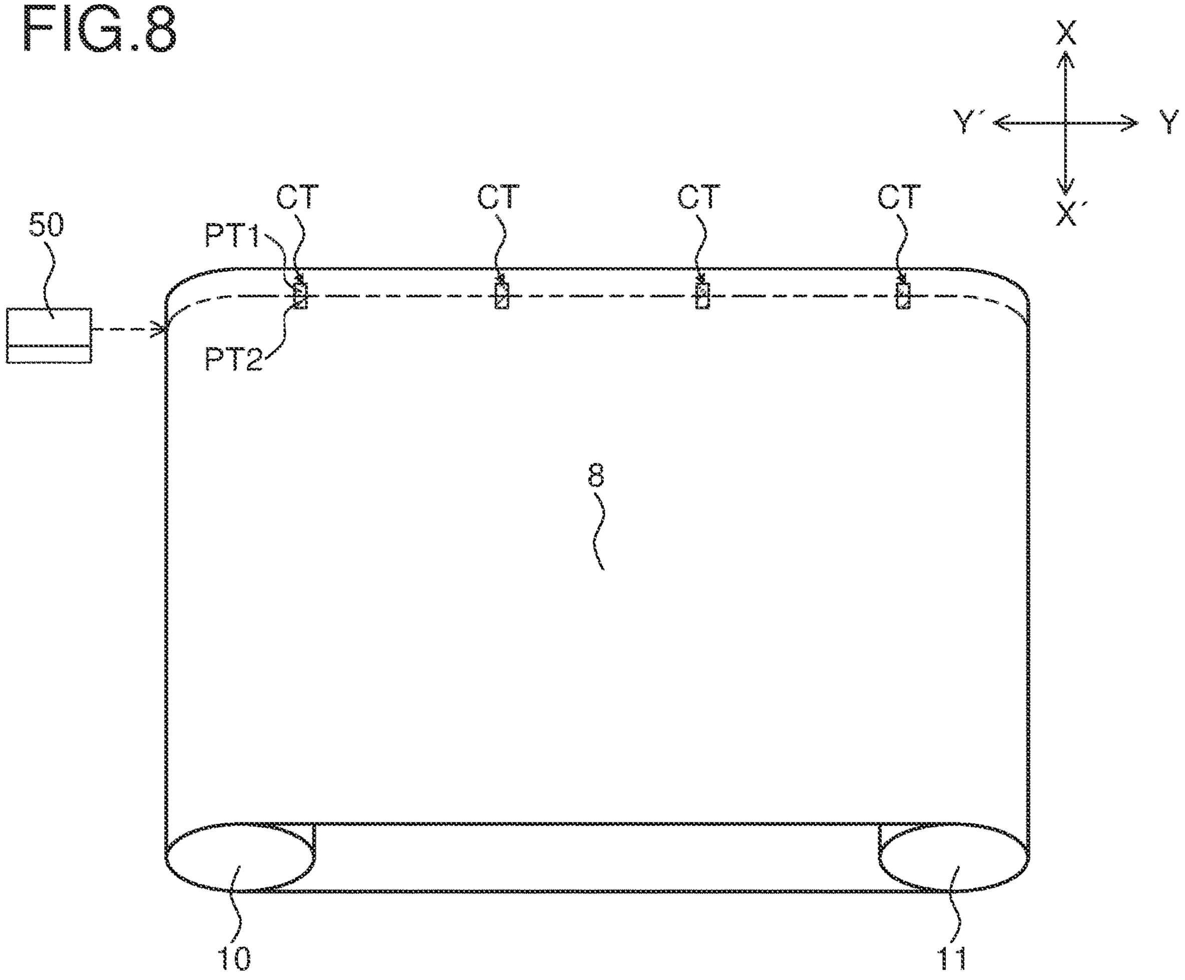
FIG. 8 is a perspective view showing an intermediate transfer belt on which evaluation charts are formed.
Figure 9:
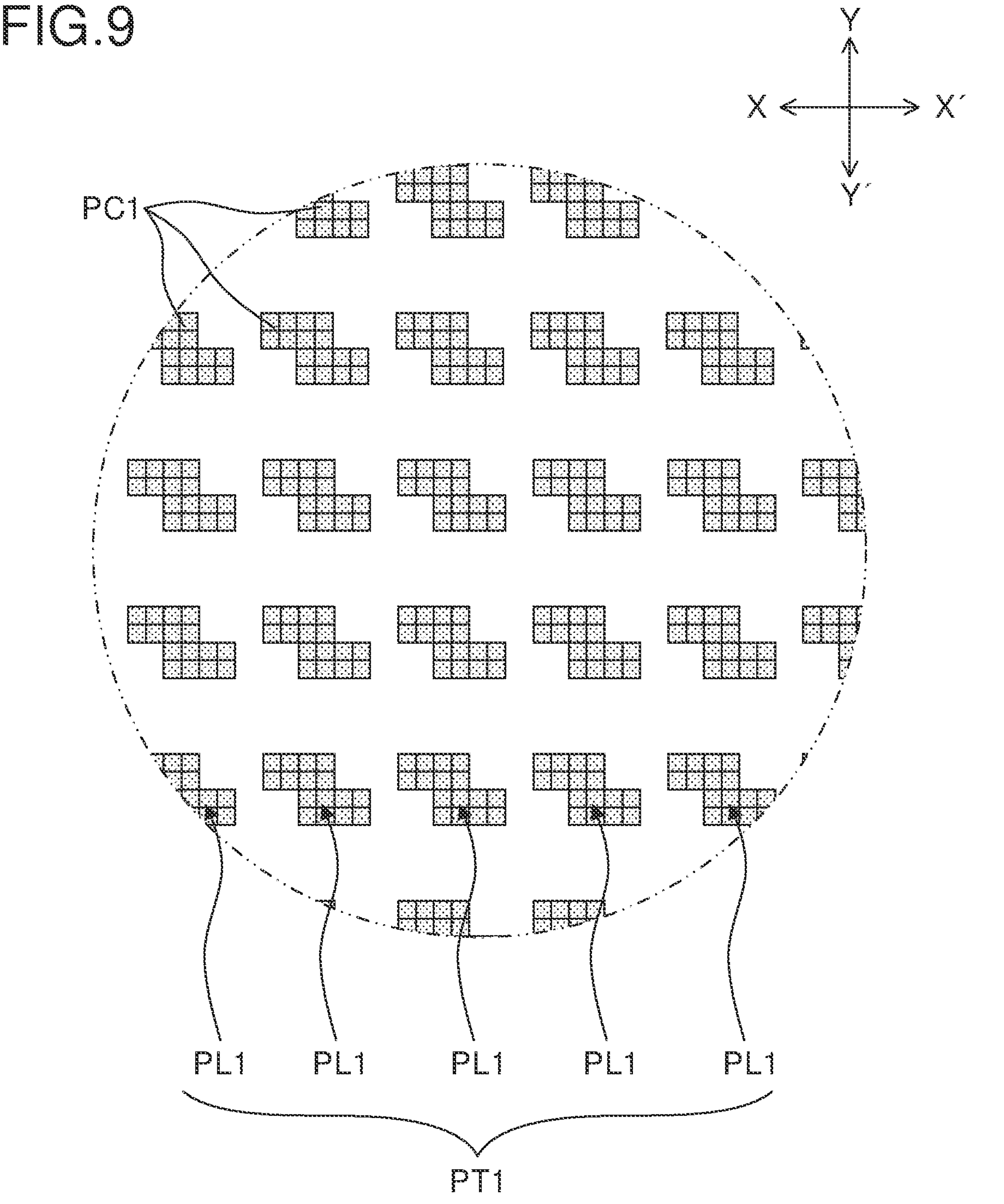
FIG. 9 is an enlarged plan view of a first evaluation pattern in the evaluation chart.

FIG. 8 is a diagram showing the intermediate transfer belt 8 on which the evaluation charts CT are formed. FIG. 9 is an enlarged plan view of a first evaluation pattern PT1 in the evaluation chart CT. In drawings including FIG. 9 where the evaluation chart CT is enlarged, a left/right direction in the plane of the figure (direction indicated by arrows X-X' shown in the figure) is assumed to be the main scanning direction, and an up/down direction in the plane of the figure (direction indicated by arrows Y-Y' shown in the figure) is assumed to be the subscanning direction. As shown in FIG. 8, the evaluation charts CT visualized by the developing devices 3*a* to 3*d* are formed on the intermediate transfer belt 8. The evaluation charts CT are respectively drawn for magenta, cyan, yellow and black.

A plurality of evaluation charts CT are linearly drawn in the circumferential direction of the intermediate transfer belt 8 (the subscanning direction, the direction indicated by arrows Y-Y' in FIG. 8) to be spaced at predetermined intervals. The evaluation charts CT are arranged in positions which overlap the image density sensor 50 in the direction of the width of the intermediate transfer belt 8 (the main scanning direction, the direction indicated by arrows X-X' in FIG. 8). The intermediate transfer belt 8 is rotated, and thus the image density sensor 50 can measure the evaluation charts CT a plurality of times, calculates the displacement of the dots DT1 to DT8 (dot displacement) from the average value of the results of the measurements performed a plurality of times and thereby reduces unevenness in the detection.

The evaluation chart CT includes a first evaluation pattern PT1 and a second evaluation pattern PT2 which are drawn in a rectangular shape. The first evaluation pattern PT1 and the second evaluation pattern PT2 are arranged adjacent in the main scanning direction.

As shown in FIG. 9, the first evaluation pattern PT1 includes a plurality of first evaluation patches PC1. The first evaluation patches PC1 are arranged to be spaced at predetermined intervals in the main scanning direction (direction indicated by arrows X-X' in the figure) and in the subscanning direction (direction indicated by arrows Y-Y' in the figure). A plurality of first evaluation patches PC1 are arranged to be spaced at predetermined intervals in the subscanning direction so as to form a first patch row PL1. A plurality of first patch rows PL1 are arranged to be spaced at predetermined intervals in the main scanning direction so as to form the first evaluation pattern PT1.

Figure 10:
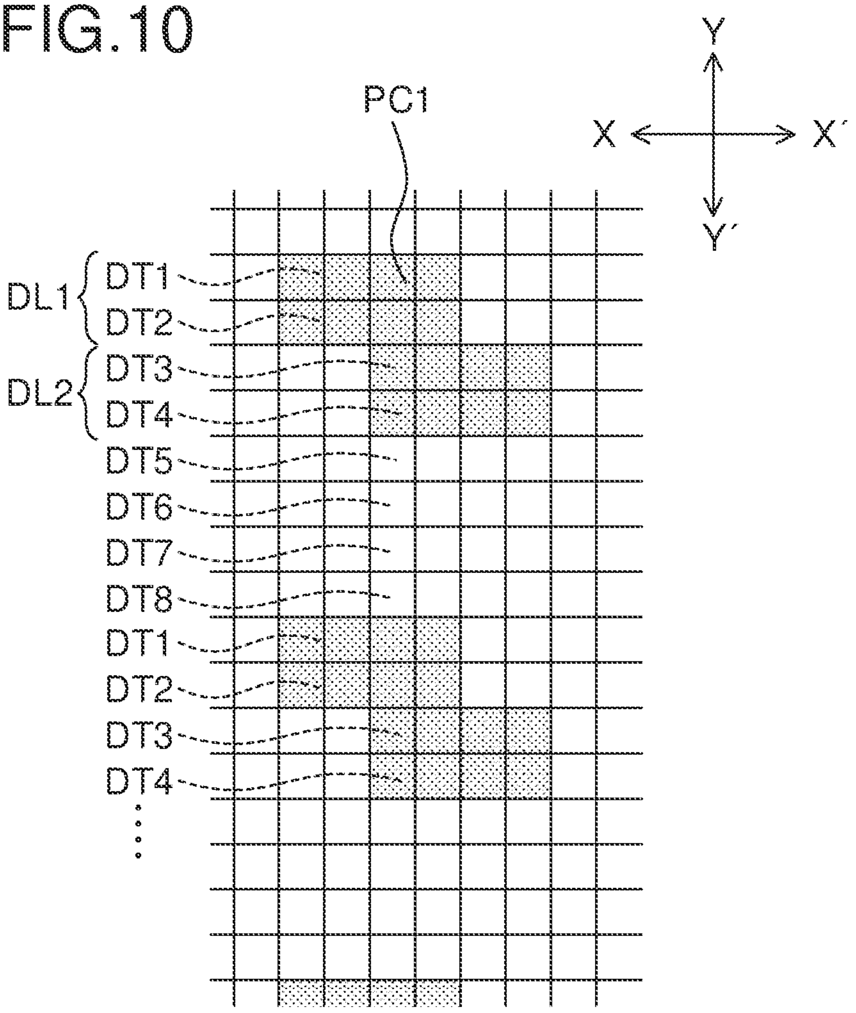
FIG. 10 is an enlarged view of a first evaluation patch which is a part shown in FIG. 9.

FIG. 10 is an enlarged view of the first evaluation patch PC1 which is a part shown in FIG. 9. The first evaluation patch PC1 is drawn with the light beams LB1 to LB4 emitted from the laser diodes LD1 to LD4 by selecting, dot by dot, the turning on and off thereof. The first evaluation patch PC1 includes a first dot row DL1 and a second dot row DL2. The first dot row DL1 and the second dot row DL2 are rows of dots DT1 to DT4 drawn linearly and continuously such that each of the first dot row DL1 and the second dot row DL2 has a length corresponding to two dots in the subscanning direction and a length corresponding to four dots in the main scanning direction.

The first dot row DL1 is drawn by the light beams LB1 and LB2 emitted from the laser diodes LD1 and LD2 (see FIG. 3). Specifically, the first dot row DL1 is formed with a plurality of dots DT1 and dots DT2 which are arranged linearly and continuously in the main scanning direction. In the dots DT1 and the dots DT2, the writing start positions in the main scanning direction are the same position.

The second dot row DL2 is drawn by the light beams LB3 and LB4 emitted from the laser diodes LD3 and LD4 (see FIG. 3). Specifically, the second dot row DL2 is formed with a plurality of dots DT3 and dots DT4 which are arranged linearly and continuously in the main scanning direction. In the dots DT3 and the dots DT4, the writing start positions in the main scanning direction are the same position.

The second dot row DL2 is continuously connected to the lower portion of the first dot row DL1 in the subscanning direction. The second dot row DL2 is displaced a predetermined number of dots (here, two dots) to a downstream side with respect to the first dot row DL1 in the main scanning direction.

Figure 11:
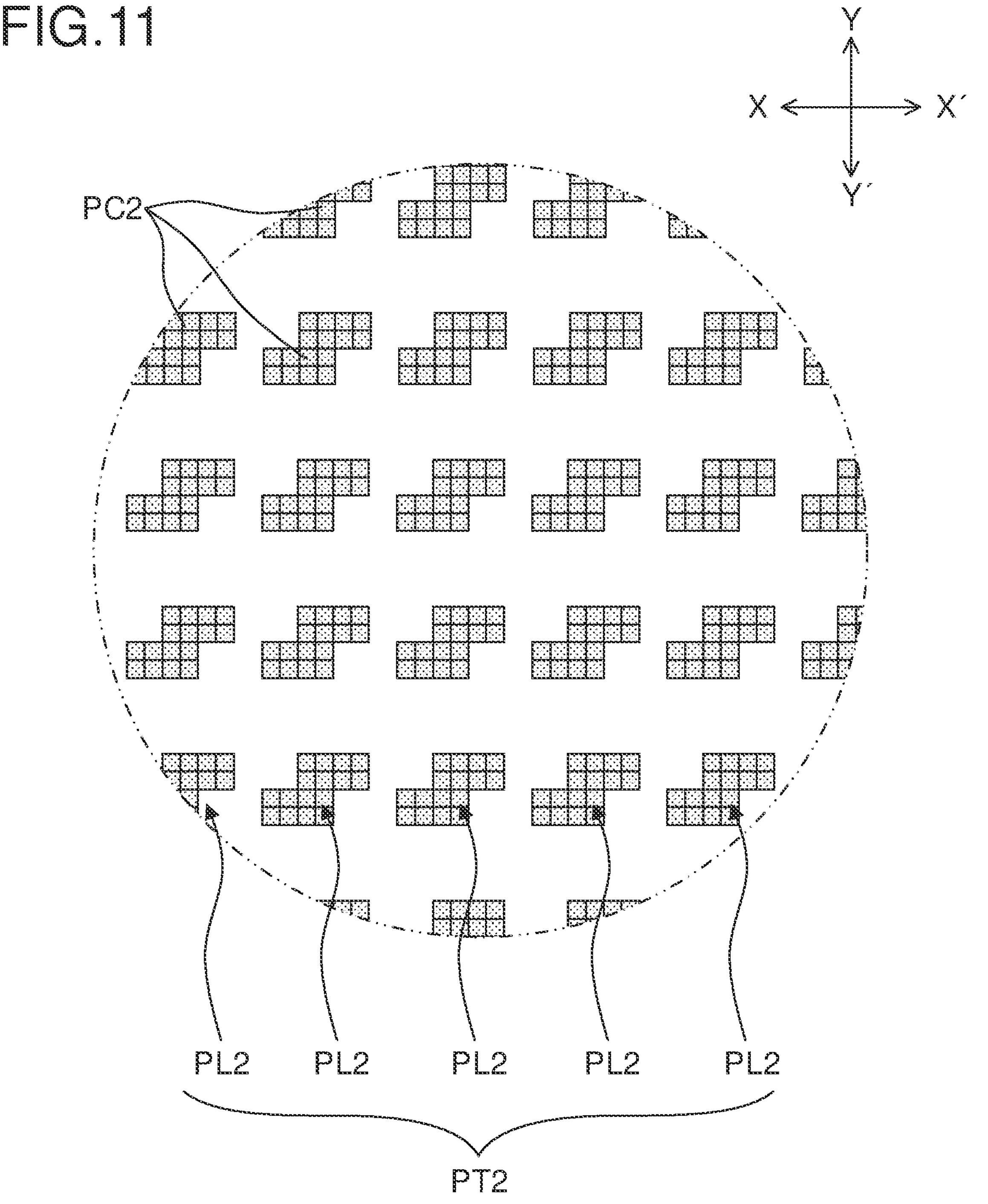
FIG. 11 is an enlarged view of a second evaluation pattern which is a part shown in FIG. 8.

FIG. 11 is an enlarged view of the second evaluation pattern PT2 which is a part shown in FIG. 8. The second evaluation pattern PT2 includes a plurality of second evaluation patches PC2. The second evaluation patches PC2 are arranged to be spaced at predetermined intervals in the main scanning direction and in the subscanning direction. A plurality of second evaluation patches PC2 are arranged to be spaced at predetermined intervals in the subscanning direction so as to form a second patch row PL2. A plurality of second patch rows PL2 are arranged to be spaced at predetermined intervals in the main scanning direction so as to form the second evaluation pattern PT2.

Figure 12:
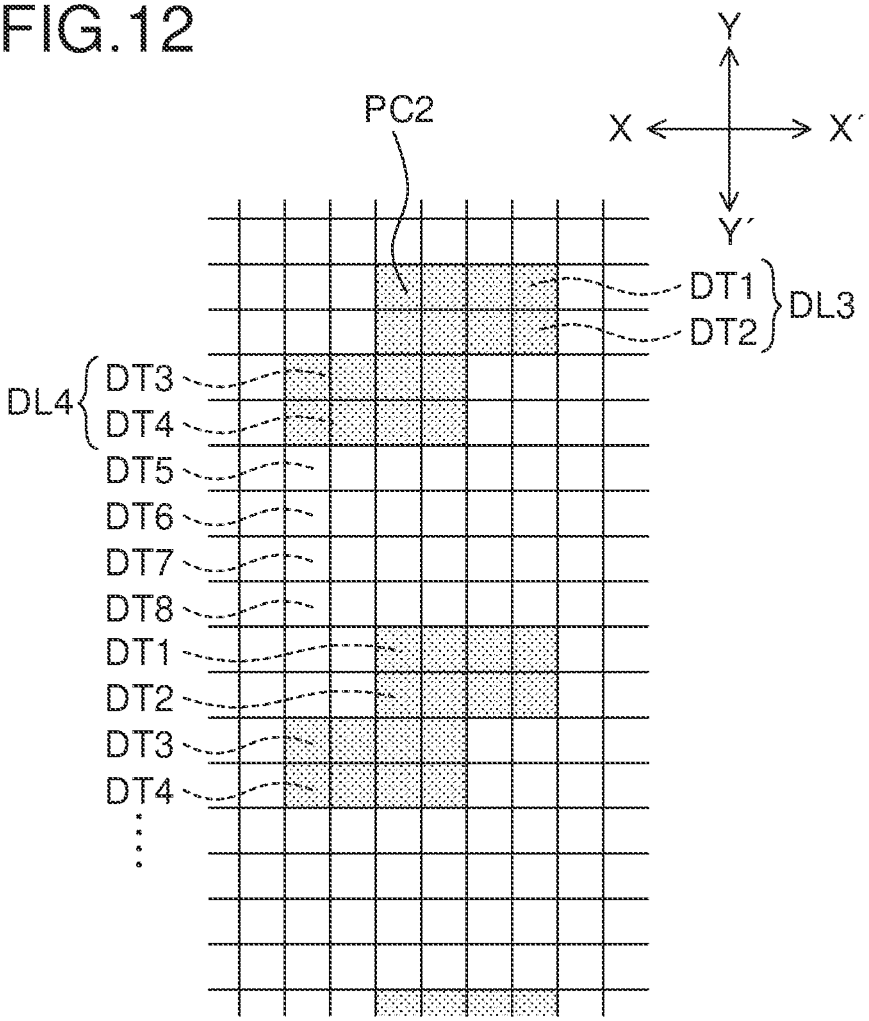
FIG. 12 is an enlarged view of a part of second evaluation patches shown in FIG. 11.

FIG. 12 is an enlarged view of a part of the second evaluation patches PC2 shown in FIG. 11. As with the first evaluation patch PC1, the second evaluation patch PC2 is drawn with the light beams LB1 to LB4 emitted from the laser diodes LD1 to LD4 by repeating, dot by dot, the turning on and off thereof.

As shown in FIG. 12, the second evaluation patch PC2 includes a third dot row DL3 and a fourth dot row DL4. The third dot row DL3 and the fourth dot row DL4 are rows of dots drawn linearly and continuously such that each of the third dot row DL3 and the fourth dot row DL4 has a length corresponding to two dots in the subscanning direction and a length corresponding to four dots in the main scanning direction. Since the arrangement of the dots DT1 to DT4 in the second evaluation patch PC2 is symmetrical with the first evaluation patch PC1 in the main scanning direction, the description thereof is omitted.

Figure 13:
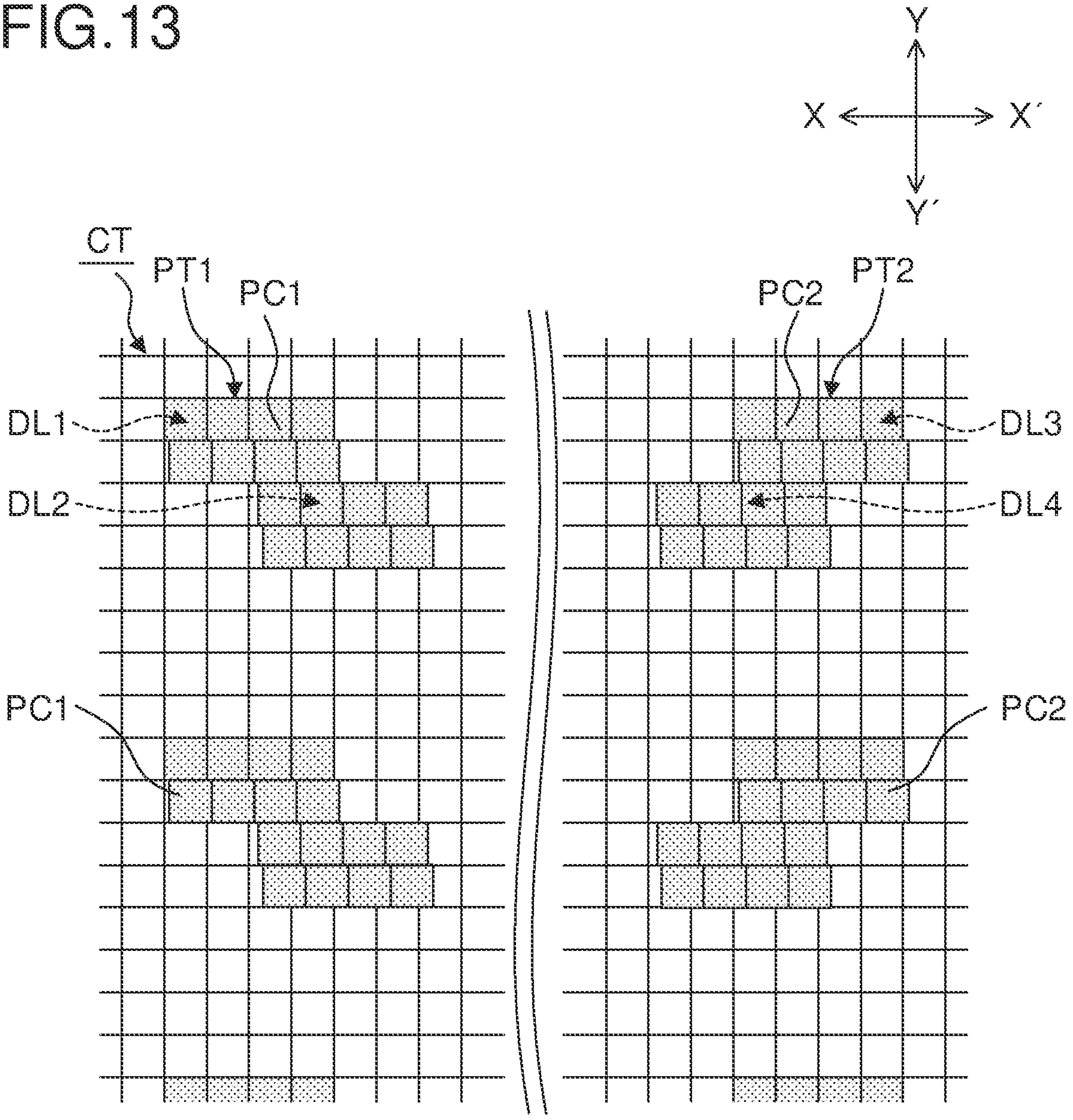
FIG. 13 is a plan view showing the first evaluation patch and the second evaluation patch when a dot displacement occurs.

If as shown in FIG. 13, a dot displacement occurs on the light beams LB2 to LB8 to the downstream side in the main scanning direction (the right side in the figure), the dots DT2 to DT4 in the first evaluation patch PC1 and the second evaluation patch PC2 are displaced to the downstream side in the main scanning direction. Then, although the amount of dot displacement in the second dot row DL2 with respect to the first dot row DL1 is increased, the amount of dot displacement in the fourth dot row DL4 with respect to the third dot row DL3 is decreased. Hence, the first evaluation patch PC1 is deformed to be stretched in the main scanning direction, and the second evaluation patch PC2 is deformed to be reduced in the main scanning direction. In other words, an area of a part in which the first dot row DL1 overlaps the second dot row DL2 in the main scanning direction is decreased whereas an area of a part in which the third dot row DL3 overlaps the fourth dot row DL4 is increased.

Hence, in this case, the first evaluation patch PC1 and the second evaluation patch PC2 are asymmetric in the main scanning direction, and thus a density difference occurs between an image density in the first evaluation patch PC1 (a ratio of the total area of the dots DT1 to DT4 drawn in a rectangular region to the rectangular region surrounded by a straight line overlapping both ends of the first evaluation patch PC1 in the main scanning direction and a straight line overlapping both ends thereof in the subscanning direction) and an image density in the second evaluation patch PC2. In this way, a difference in image density occurs between the evaluation pattern PT1 and the second evaluation pattern PT2.

In the case shown in FIG. 13, as compared with the second evaluation patch PC2, the image density in the first evaluation patch PC1 is lowered. The density difference described above is detected with the image density sensor 50, and thus the control portion 90 can detect that a dot displacement occurs on the dots DT1 to DT8 in the main scanning direction. Since the user can visually check the density difference by the loss of symmetry between the first evaluation pattern PT1 and the second evaluation pattern PT2, the user can check the occurrence of the dot displacement in the dots DT1 to DT8.

The amount of displacement in each of the dots DT2 to DT8 in the state where the dot displacement occurs is increased sequentially from the dots DT2 to the dots DT8 (as the dots are more distant from the dots DT1). In other words, the amount of dot displacement in the dots DT8 is higher than those in the other dots DT2 to DT7. This is because the amounts of dot displacement in the DT2 to DT7 are sequentially accumulated.

Figure 14:
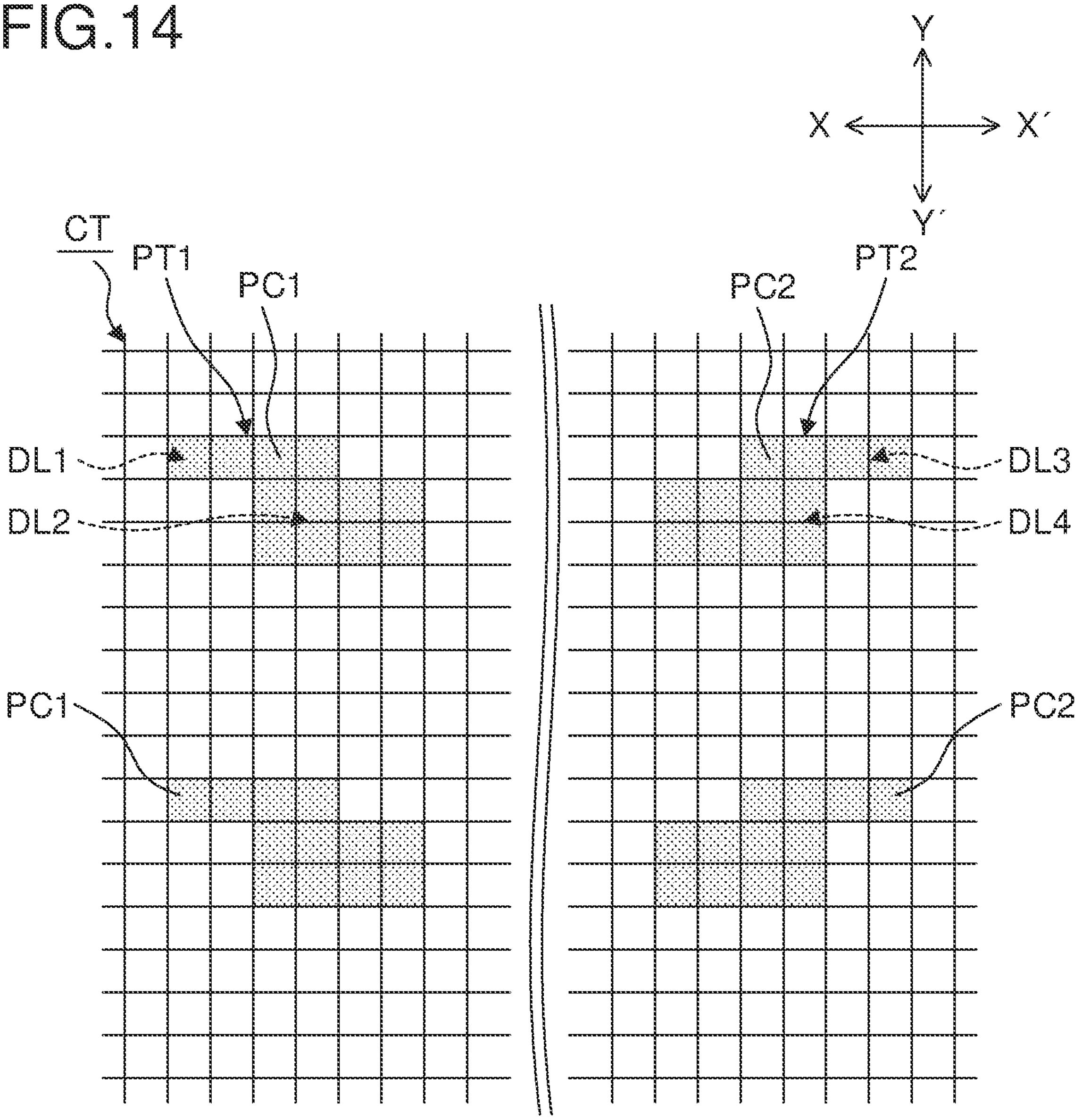
FIG. 14 is a plan view showing a variation of the evaluation chart in the image forming apparatus according to the first embodiment.

As the first evaluation patch PC1 and the second evaluation patch PC2 in the present embodiment, for example, as shown in FIG. 14, a first evaluation patch PC1 in which the first dot row DL1 is formed with one row and a second evaluation patch PC2 in which the third dot row DL3 is formed with one row can be adopted. In this case, for example, the first dot row DL1 and the third dot row DL3 can be drawn by the laser diode LD1, and the second dot row DL2 and the fourth dot row DL4 can be drawn by the laser diodes LD2 and LD3.

Figure 15:
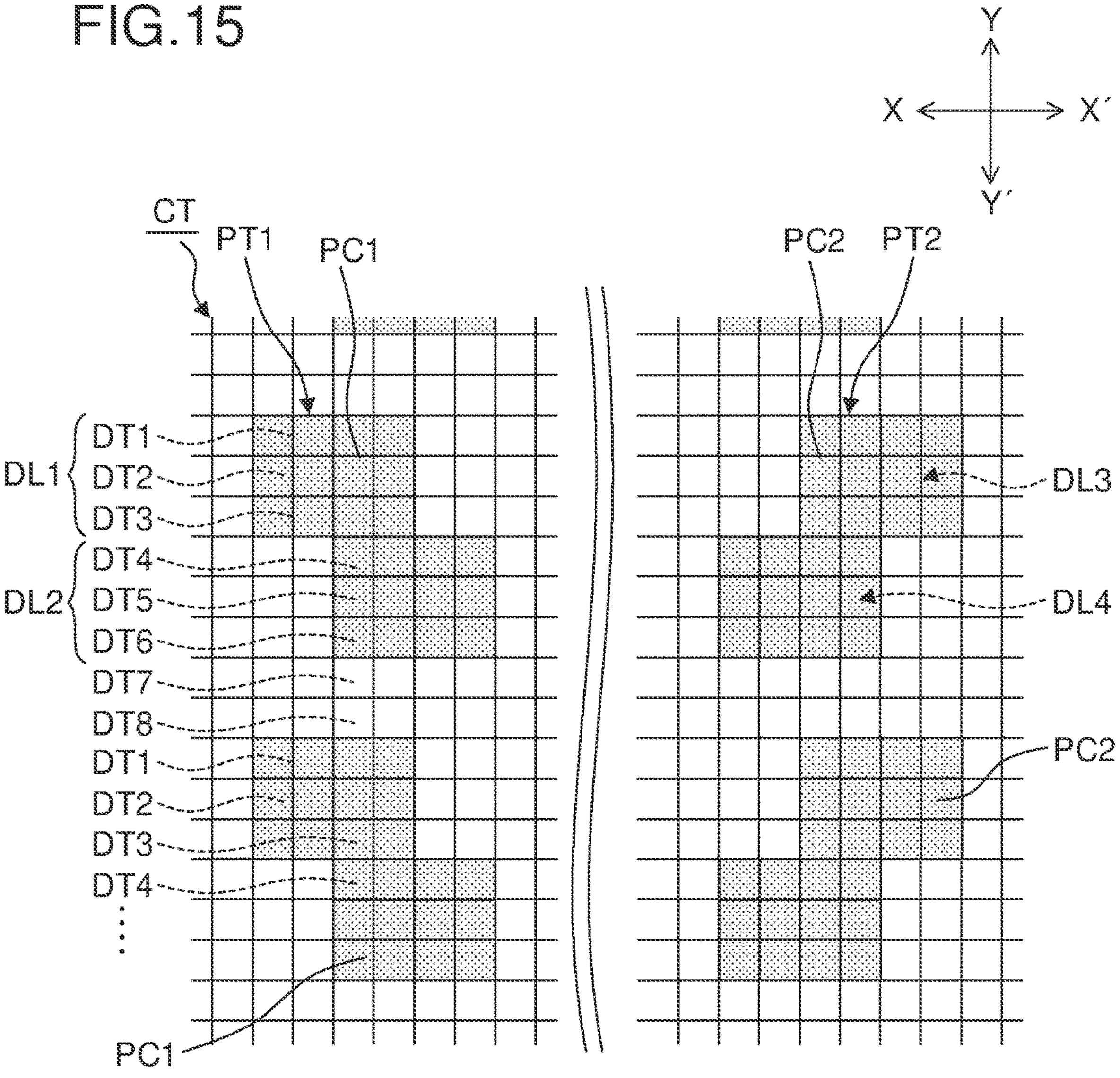
FIG. 15 is a plan view showing another variation of the evaluation chart in the image forming apparatus according to the first embodiment.

For example, as shown in FIG. 15, dot rows each of which is formed with three rows and in which the number of dots in the subscanning direction in each of the first dot row DL1, the second dot row DL2, the third dot row DL3 and the fourth dot row DL4 is three can also be adopted. In this case, for example, the first dot row DL1 and the third dot row DL3 can be drawn by the laser diodes LD1 to LD3, and the second dot row DL2 and the fourth dot row DL4 can be drawn by the laser diodes LD4 to LD6. The first dot row DL1 and the third dot row DL3 can also be drawn by the laser diodes LD4 to LD6, and the second dot row DL2 and the fourth dot row DL4 can also be drawn by the laser diodes LD1 to LD3.

Figure 16:
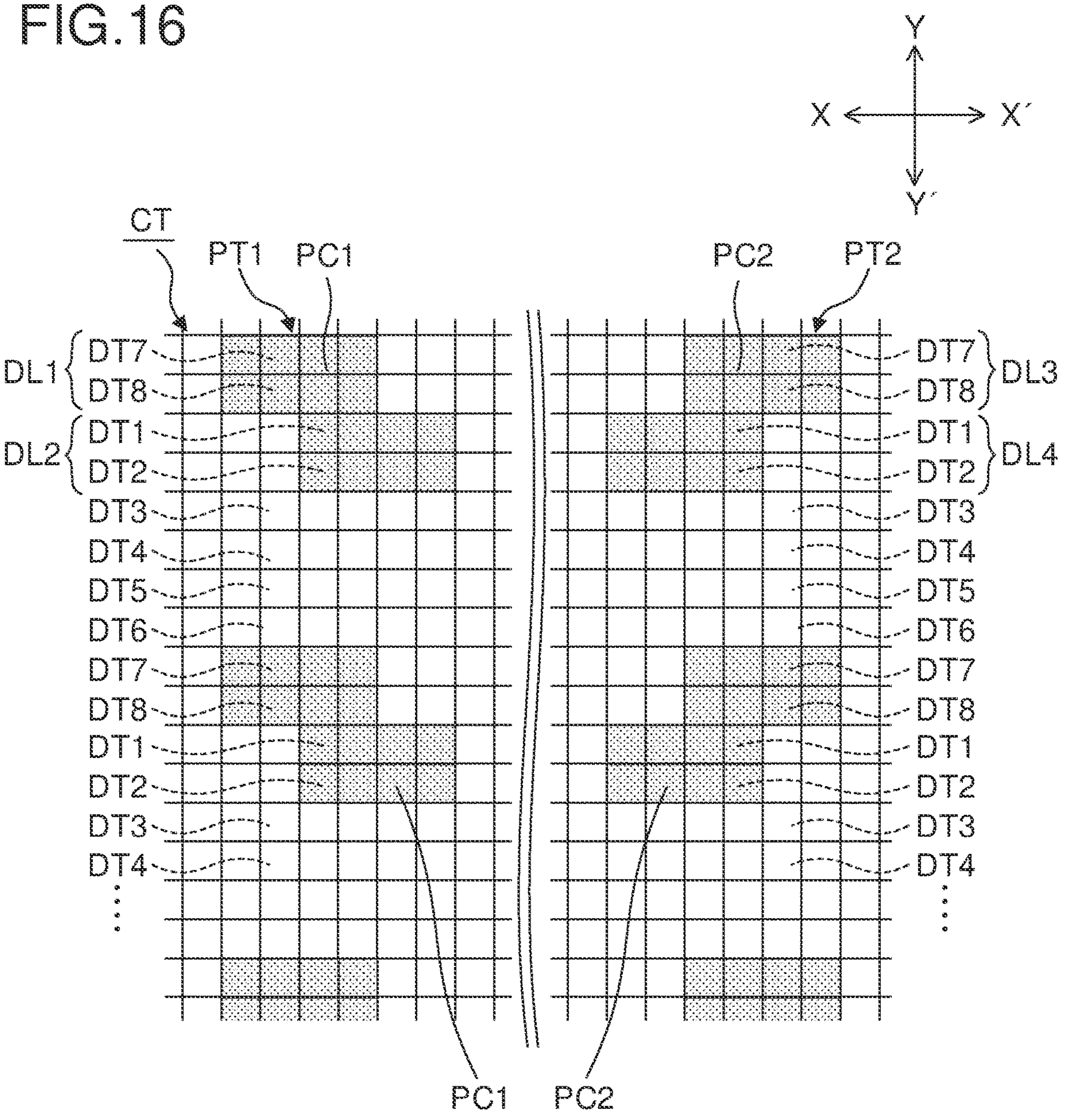
FIG. 16 is an enlarged view of the first evaluation patch of an evaluation chart in an image forming apparatus according to a second embodiment.

An image forming apparatus 100 according to a second embodiment will then be described. FIG. 16 is an enlarged view of the first evaluation patch PC1 of an evaluation chart CT in the second embodiment. Differences from the first embodiment will be described below, the same configurations as in the first embodiment are identified with the same symbols and the description thereof is omitted.

In the image forming apparatus 100 according to the second embodiment, a part of the light beams LB1 to LB8 are formed as an image on a predetermined first deflection surface 63*a*, and the remaining beams of the light beams LB1 to LB8 are formed as an image on a second deflection surface 63*b* adjacent to the first deflection surface 63*a* (see FIG. 2). More specifically, among the light beams LB1 to LB8, the light beams LBs (here, the light beams LB7 and LB8) which draw the first dot row DL1 and the third dot row DL3 are formed as an image on the first deflection surface 63*a*, and the light beams LBs (here, the light beams LB1 and LB2) which draw the second dot row DL2 and the fourth dot row DL4 are formed as an image on the second deflection surface 63*b*. In other words, the first dot row DL1 and the third dot row DL3 are formed with the dots DT7 and DT8. The second dot row DL2 is formed with the dots DT1 and DT2.

Figure 17:
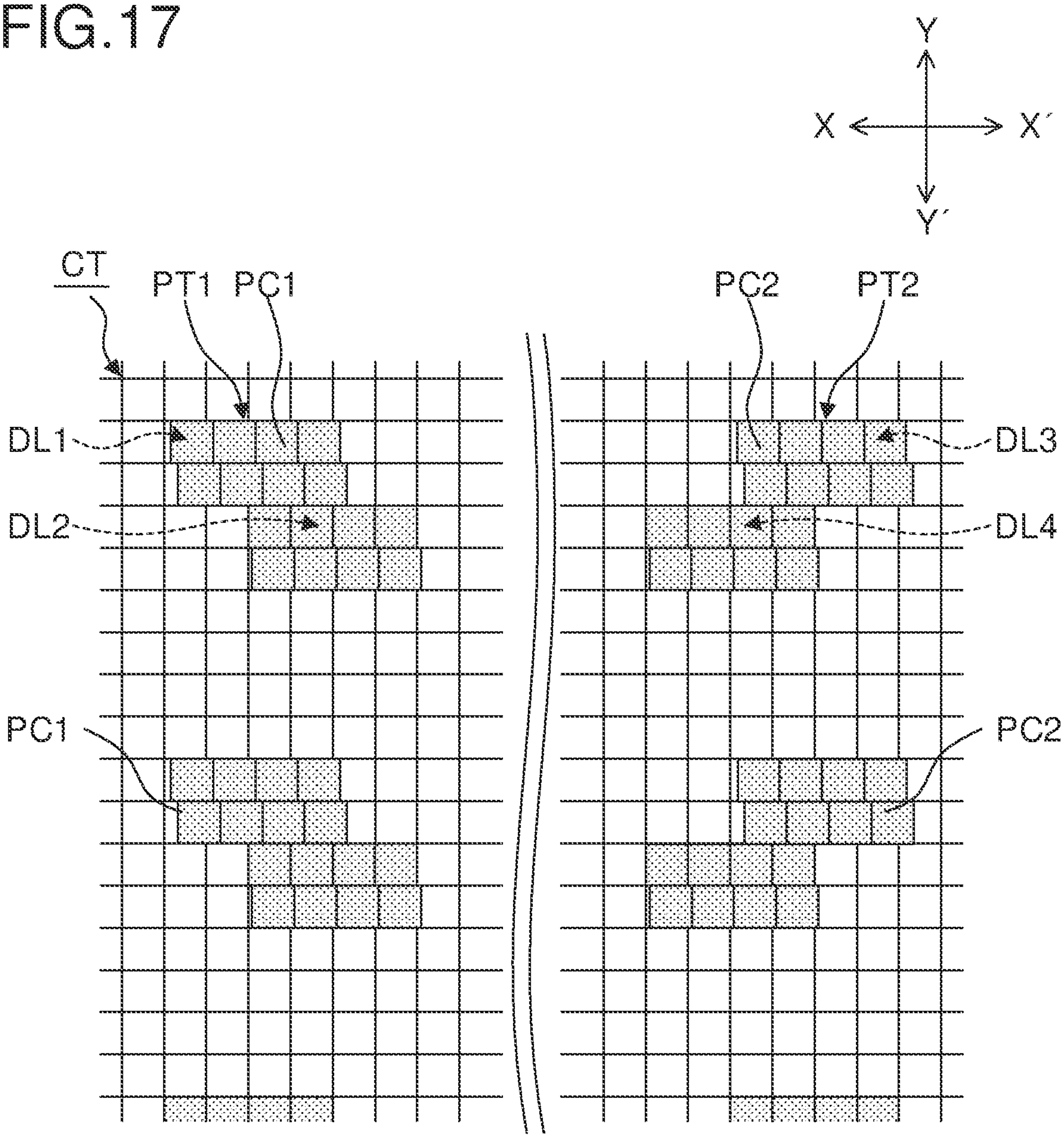
FIG. 17 is a plan view showing the evaluation chart in the second embodiment in a state where a dot displacement occurs.

Here, as described above, the amount of dot displacement in the dots DT8 is higher than those in the other dots DT2 to DT7. Then, in the present embodiment, the first dot row DL1 and the third dot row DL3 are formed with the dots DT7 and DT8, and the second dot row DL2 and the fourth dot row DL4 are formed with the dots DT1 and DT2. Hence, if as shown in FIG. 17, a dot displacement occurs on the laser diodes LD2 to LD8 to the downstream side in the main scanning direction, the amount of dot displacement is relatively high. Then, a density difference between an image density in the first evaluation patch PC1 and an image density in the second evaluation patch PC2 is relatively high. Hence, it is possible to more clearly detect the occurrence of the dot displacement.

As in the first embodiment, as the first dot row DL1 and the fourth dot row DL4 in the present embodiment, a first dot row DL1 which is formed with one row and a fourth dot row DL4 which is formed with one row can be adopted. Dot rows each of which is formed with three rows and in which the number of dots in the subscanning direction in each of the first dot row DL1, the second dot row DL2, the third dot row DL3 and the fourth dot row DL4 is three can also be adopted.

Figure 18:
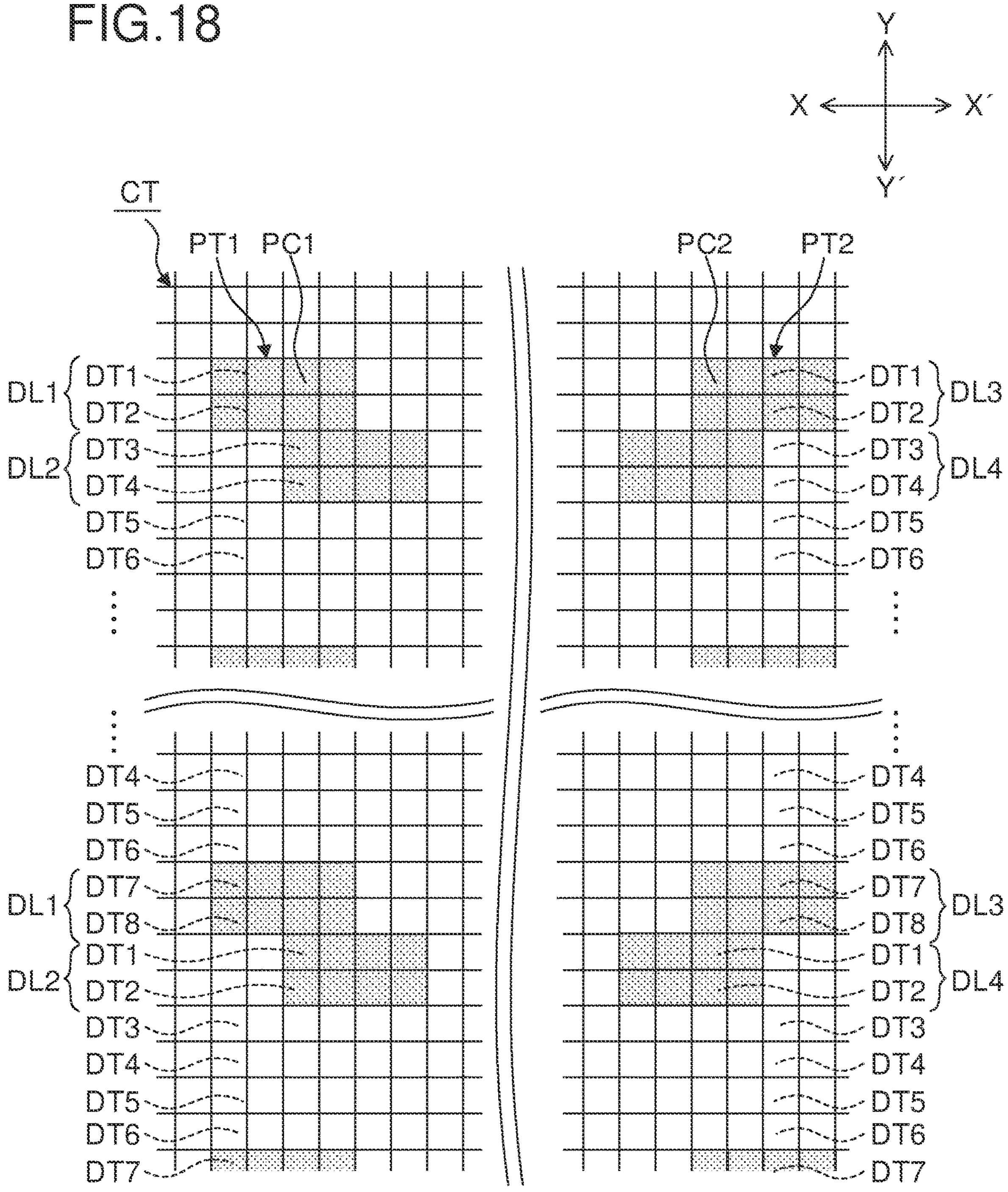
FIG. 18 is an enlarged view of a plurality of first patch rows of a first evaluation pattern in an image forming apparatus according to a third embodiment.

An image forming apparatus 100 according to a third embodiment will then be described. FIG. 18 is an enlarged view of the first evaluation pattern PT1 of an evaluation chart CT in the third embodiment. Differences from the first embodiment will be described below, the same configurations as in the first embodiment are identified with the same symbols and the description thereof is omitted.

As shown in FIG. 18, the evaluation chart CT in the third embodiment includes the first evaluation pattern PT1 and the second evaluation pattern PT2 in the first embodiment (an upper part shown in the figure) and the first evaluation pattern PT1 and the second evaluation pattern PT2 in the second embodiment (a lower part shown in the figure). Specifically, the first evaluation pattern PT1 (identical surface first evaluation pattern) and the second evaluation pattern PT2 (identical surface second evaluation pattern) in the upper part shown in the figure include the first evaluation patch PC1 and the second evaluation patch PC2 which are drawn by forming all the light beams LB1 to LB8 as an image on the predetermined first deflection surface 63*a* (see FIG. 2) (hereinafter referred to as "identical surface scanning"). A difference between an image density in the first evaluation pattern PT1 and an image density in the second evaluation pattern PT2 is assumed to be a first density difference.

On the other hand, the first evaluation pattern PT1 (different scanning surface first evaluation pattern) and the second evaluation pattern PT2 (different scanning surface second evaluation pattern) in the lower part shown in the figure include the first evaluation patch PC1 and the second evaluation patch PC2 which are drawn by forming a part of the light beams LB1 to LB8 (here, the light beams LB7 and LB8) as an image on the predetermined first deflection surface 63*a* and forming the remaining beams (here, the light beams LB1 to LB6) of the light beams LB1 to LB8 as an image on the second deflection surface 63*b* (see FIG. 2) (hereinafter referred to as "different scanning surface scanning"). A difference between an image density in the first evaluation pattern PT1 and an image density in the second evaluation pattern PT2 is assumed to be a second density difference.

In the image forming apparatus 100 of the present embodiment, an evaluation chart CT (first evaluation chart) formed under a first setting value and an evaluation chart CT (second evaluation chart) formed under a second setting value which will be described later are formed, and thus it is possible to calculate the amount of dot displacement from the first density difference and the second density difference in the evaluation charts.

Figure 19:
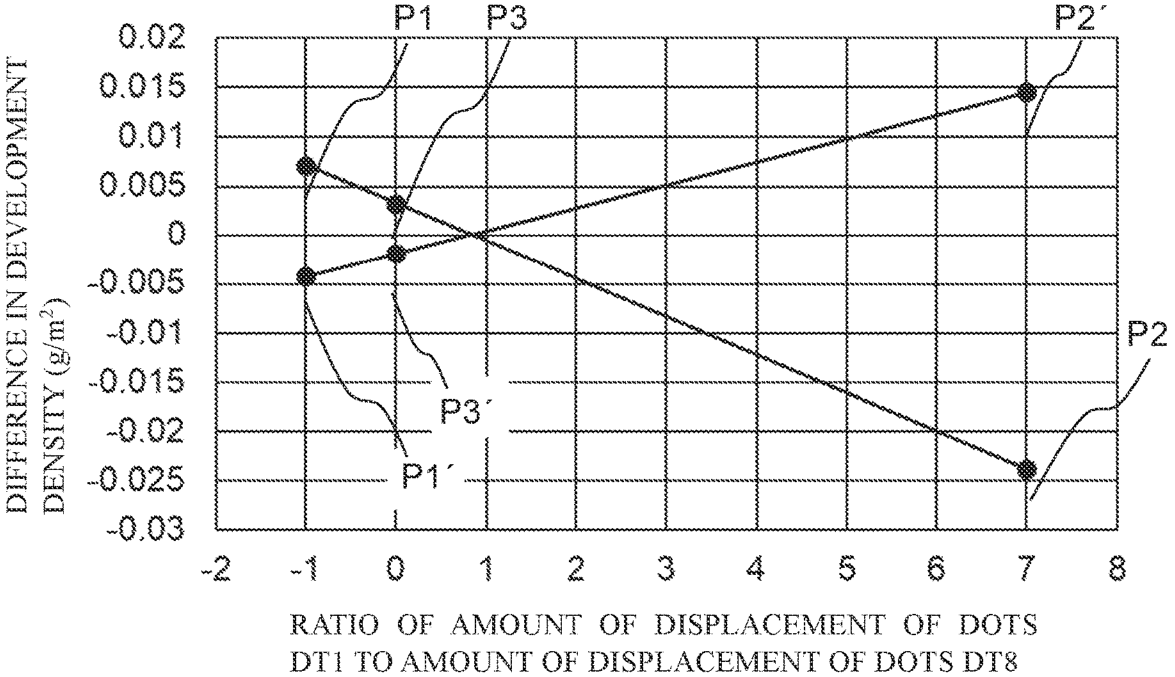
FIG. 19 is a graph showing a relationship between the amount of position displacement and a difference in development density.

FIG. 19 is a graph showing a relationship between the amount of position displacement and a difference in development density (difference in image density). The horizontal axis represents a position displacement ratio, and the vertical axis represents the value of a density difference. An example will be specifically described below where the amount of dot displacement described above is calculated from an evaluation chart CT formed by setting a distance between the dots DT1 and the dots DT8 in the main scanning direction to the first setting value (−13.125 μm) and an evaluation chart CT formed by setting the first setting value to the second setting value obtained by displacing the dots DT8 to the downstream side (+ side) by 21 μm.

When the dots DT1 and the dots DT8 are displaced to the upstream side (− side) in the main scanning direction by 1 μm at the time of the identical surface scanning, the dots DT1 and the dots DT8 are displaced to the downstream side (+ side) in the main scanning direction by 7 μm at the time of the different scanning surface scanning. Hence, in the graph of FIG. 19, in the identical surface scanning, a point P1 is plotted with the horizontal axis set to −1 and the vertical axis set to the first density difference, and in the different scanning surface scanning, a point P2 is plotted with the horizontal axis set to 7 and the vertical axis set to the second density difference.

Here, in the first evaluation chart CT, the first density difference was 0.0072 (g/m$^2$), and the second density difference was −0.0238 (g/m$^2$). Hence, the coordinates (X, Y) of the point P1 are (−1, 0.0072), and the coordinates (X, Y) of the point P2 are (7, −0.0238). In the second evaluation chart CT, the first density difference was −0.0042 (g/m$^2$), and the second density difference was 0.0145 (g/m$^2$). In the case of the second evaluation chart CT, a point P1' (−1, −0.0042) and a point P2' (−7, 0.0145) are likewise plotted. The y-intercept P3 (first noise value) of a straight line connecting the point P1 and the point P2 and the y-intercept P3' (second noise value) of a straight line connecting the point P1' and the point P2' are calculated.

The y-intercept P3 is 0.00328 whereas the y-intercept P3' is −0.00189. Since the ratio of P3 to P3' is 1:−0.57566, 21 μm described above is divided into two such that the ratio of 1:−0.57566 is achieved. Then, in the first evaluation chart CT, the value is −13.328 μm, and in the second evaluation chart CT, the value is +7.672 μm. These values are divided by a value (the number of gaps between the adjacent laser diodes LD1 to LD8) obtained by subtracting 1 from 8 serving as the number of laser diodes LD1 to LD8, and thus it is possible to calculate the amount of dot displacement in the adjacent laser diodes LD1 to LD8. Therefore, the amount of dot displacement in the first evaluation chart CT is calculated to be −1.904 μm, and the amount of dot displacement in the second evaluation chart CT is calculated to be 1.096 μm. The dot displacement correction value described previously is calculated based on the amounts of dot displacement described above.

Here, as described above, in the first evaluation chart CT, the first setting value (−13.125 μm) is set. Hence, the actual amount of dot displacement in the first evaluation chart CT is −1.875 μm which is obtained by dividing the first setting value (−13.125 μm) by the number of gaps (here, 7) between the adjacent laser diodes LD1 to LD8. Since the amount of dot displacement calculated by the method described above is −1.904 μm, it can be confirmed that this value is close to the actual amount of dot displacement (−1.875 μm). Likewise, since the actual amount of dot displacement in the second evaluation chart CT is 1.125 μm, this value is close to the amount of dot displacement (1.096 μm) in the second evaluation chart CT calculated by the method described above.

Here, in a conventional image forming apparatus 100, an evaluation patch PC formed with first to fourth dot rows DL1 to DL4 in which the number of dots in the subscanning direction is one is used to detect a change in image density.

Hence, in each of a part in which the first dot row DL1 overlaps the second dot row DL2 in the main scanning direction and a part in which the third dot row DL3 overlaps the fourth dot row DL4, the length in the subscanning direction is relatively short. In other words, the areas of these parts are relatively small. Then, even if a dot displacement occurs to change the areas of the parts described above, the amount of change thereof is low, with the result that it is difficult to accurately detect the dot displacement.

On the other hand, in the image forming apparatus 100 of the present disclosure, the evaluation chart CT in each of the embodiments described above is adopted, and thus in at least one of the first dot row DL1 and the second dot row DL2, the number of dots in the subscanning direction is two or more. Hence, when a dot displacement occurs in the main scanning direction, an image density in the evaluation chart CT is changed relatively significantly. Therefore, a change in image density is easily detected, and thus it is possible to provide an image forming apparatus in which a dot displacement in the main scanning direction can easily be adjusted.

In the conventional image forming apparatus 100, a plurality of evaluation charts CT are formed in which the amount of dot displacement in the main scanning direction in each of evaluation patches PC is intentionally changed by a predetermined amount, and the amount of dot displacement is estimated from the change in the image density of each of the evaluation charts CT. Hence, in order to calculate the accurate amount of dot displacement, it is necessary to form a huge number of evaluation charts CT, and thus the adjustment of a dot displacement in the main scanning direction is complicated. By contrast, the image forming apparatus 100 according to the second embodiment of the present disclosure is adopted, and thus it is possible to more accurately calculate the amount of dot displacement only by forming a pair of evaluation charts CT. Hence, the adjustment of a dot displacement in the main scanning direction can be performed accurately and easily.

The present disclosure is not limited to the embodiments described above, and various variations can be made without departing from the spirit of the present disclosure. For example, although in the description of each of the embodiments described above, the first evaluation pattern PT1 and the second evaluation pattern PT2 are arranged adjacent in the subscanning direction, they may be arranged adjacent in the subscanning direction.

Figure 20:
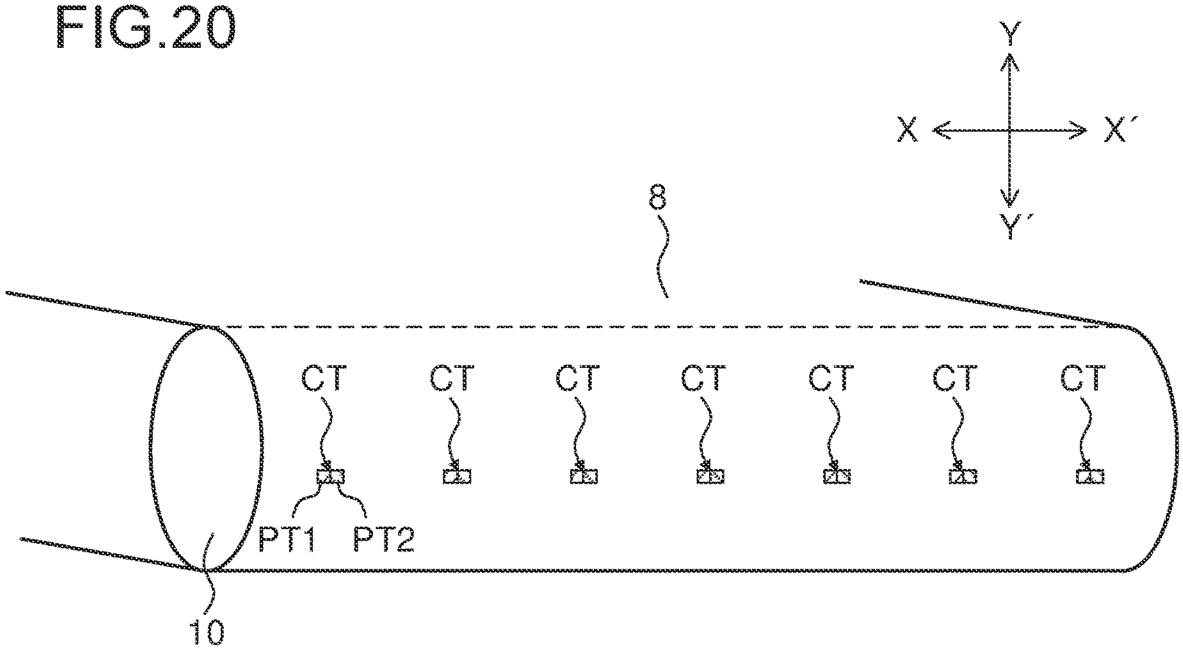
FIG. 20 is a perspective view showing a variation of the evaluation chart in the image forming apparatus according to the embodiments.

As shown in FIG. 20, a plurality of evaluation charts CT in each of the embodiments described above may be arranged at predetermined equal intervals in the main scanning direction of the intermediate transfer belt 8. In this way, it is possible to detect changes in image density at a plurality of locations in the main scanning direction. Hence, even when a dot displacement in which the amount of displacement is different occurs in each position in the main scanning direction, it is possible to appropriately correct the dot displacement in each position in the main scanning direction. The color displacement correction portion 97 in this case detects an image density in each of the evaluation charts CT with a boundary portion (center portion) of the first evaluation pattern PT1 and the second evaluation pattern PT2 adjacent to each other set as a reference position.

In this case, a configuration can also be adopted in which instead of the image density sensor 50 described previously, a scanner (not shown) included in the image forming apparatus 100 is used to scan a plurality of evaluation charts CT on the intermediate transfer belt 8 at a time and thereby detect image densities. In this case, it is possible to detect dot displacements in the positions in the main scanning direction at a time, and thus it is possible to more easily correct the dot displacements. In this case, the first evaluation pattern PT1 and the second evaluation pattern PT2 of the evaluation chart CT may be arranged adjacent in the main scanning direction.

The effects of the present disclosure will be described in further detail below using Example.

Example

In evaluation charts CT, changes in image density in each form of the evaluation pattern were investigated by an analytical method. As conditions, image densities (%) when the light scanning device 5 shown in FIG. 2 was installed in the image forming apparatus 100 shown in FIG. 1, the evaluation charts CT in the first and second embodiments of the present disclosure were drawn on print sheets (recording media) were calculated by the analytical method, and thus results obtained by sequentially displacing the positions of dots in the main scanning direction were compared. In Comparative Examples, image densities in evaluation charts CT in which the number of dots in the first dot row DL1, the second dot row DL2, the third dot row DL3 and the fourth dot row DL4 in the subscanning direction was one were also calculated.

Three types of evaluation charts CT in the first embodiment described above, three types of evaluation charts CT in the second embodiment described above and two types of evaluation charts in Comparative Examples were prepared, and image densities therein were compared. The results of analysis of the evaluation charts in the first embodiment were assumed to be Present Disclosures 1, 2 and 3, respectively. The results of analysis of the evaluation charts in the second embodiment were assumed to be Present Disclosures 4, 5 and 6, respectively.

In the evaluation chart CT of Present Disclosure 1, the number of dots in each of the first dot row DL1, the second dot row DL2, the third dot row DL3 and the fourth dot row DL4 in the subscanning direction was two (see FIGS. 9 and 11). In the evaluation chart CT of Present Disclosure 2, the number of dots in the first dot row DL1 and the third dot row DL3 in the subscanning direction was one, and the number of dots in the second dot row DL2 and the fourth dot row DL4 in the subscanning direction was two (see FIG. 14). In the evaluation chart CT of Present Disclosure 3, the number of dots in each of the first dot row DL1, the second dot row DL2, the third dot row DL3 and the fourth dot row DL4 in the subscanning direction was three (see FIG. 15).

In the evaluation chart CT of Present Disclosure 4, the number of dots in each of the first dot row DL1, the second dot row DL2, the third dot row DL3 and the fourth dot row DL4 in the subscanning direction was two (see FIG. 16). In the evaluation chart CT of Present Disclosure 5, the number of dots in the first dot row DL1 and the third dot row DL3 in the subscanning direction was one, and the number of dots in the second dot row DL2 and the fourth dot row DL4 in the subscanning direction was two. In the evaluation chart CT of Present Disclosure 5, the number of dots in each of the first dot row DL1, the second dot row DL2, the third dot row DL3 and the fourth dot row DL4 in the subscanning direction was three.

In the evaluation charts CT of Comparative Examples 1 and 2, the number of dots in each of the first dot row DL1, the second dot row DL2, the third dot row DL3 and the fourth dot row DL4 in the subscanning direction was two.

All the first dot row DL1, the second dot row DL2, the third dot row DL3 and the fourth dot row DL4 in Comparative Example 1 were drawn by the light beams LB1 and LB2 deflected by the same deflection surface 63*a*. In other words, the first dot row DL1, the second dot row DL2, the third dot row DL3 and the fourth dot row DL4 in Comparative Example 1 were formed with the dots DT1 and DT2.

The first dot row DL1 and the third dot row DL3 in Comparative Example 2 were drawn by the light beam LB8 deflected by the first deflection surface 63*a*. The second dot row DL2 and the fourth dot row DL4 in Comparative Example 2 were drawn by the light beam LB1 deflected by the second deflection surface 63*b*. In other words, the first dot row DL1 and the third dot row DL3 were formed with the dots DT8, and the second dot row DL2 and the fourth dot row DL4 were formed with the dots DT1.

Figure 21:
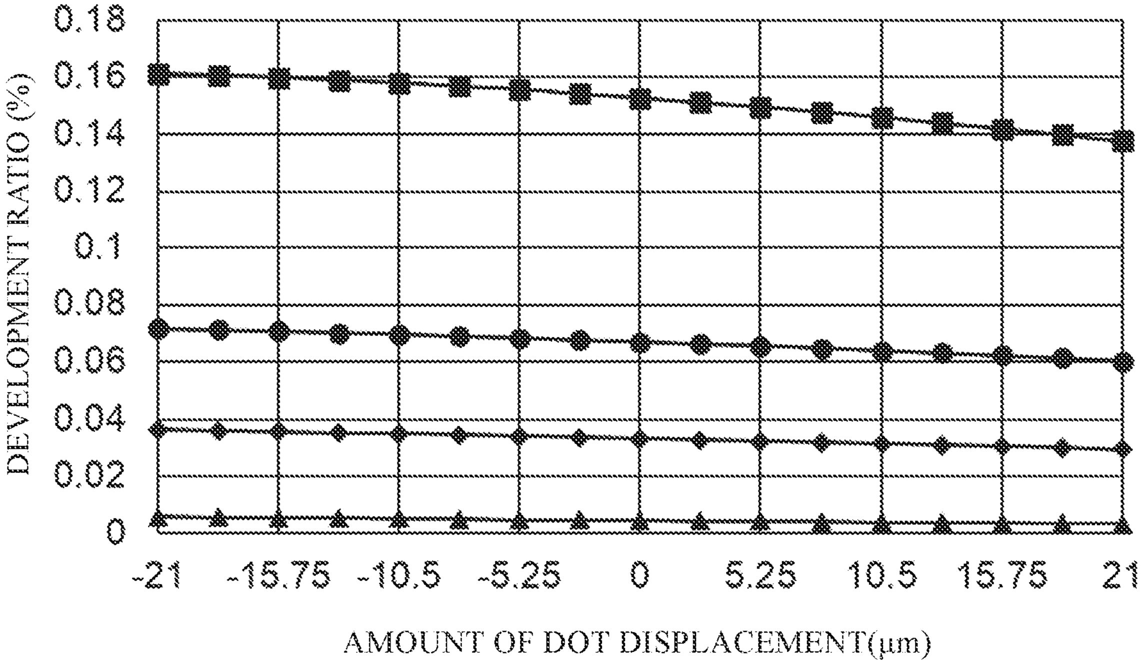
FIG. 21 is a graph showing changes in development ratio in Present Disclosures 1 to 3 of Example and in Comparative Example 1.
Figure 22:
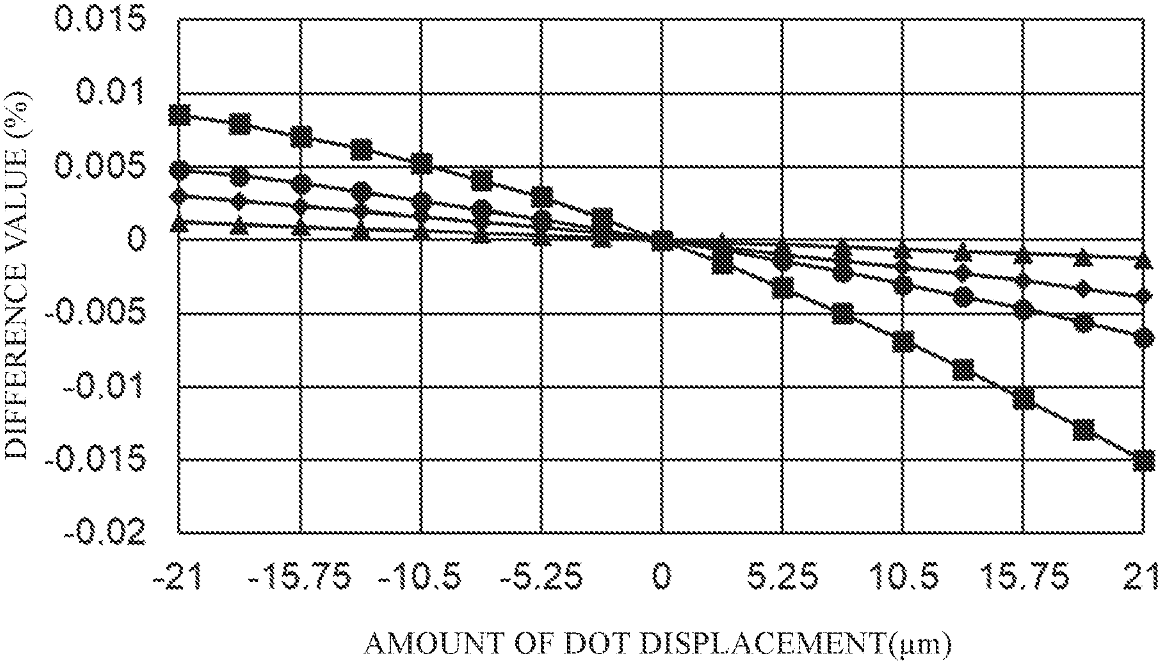
FIG. 22 is a graph showing changes in difference value in Present Disclosures 1 to 3 of Example and in Comparative Example 1.
Figure 23:
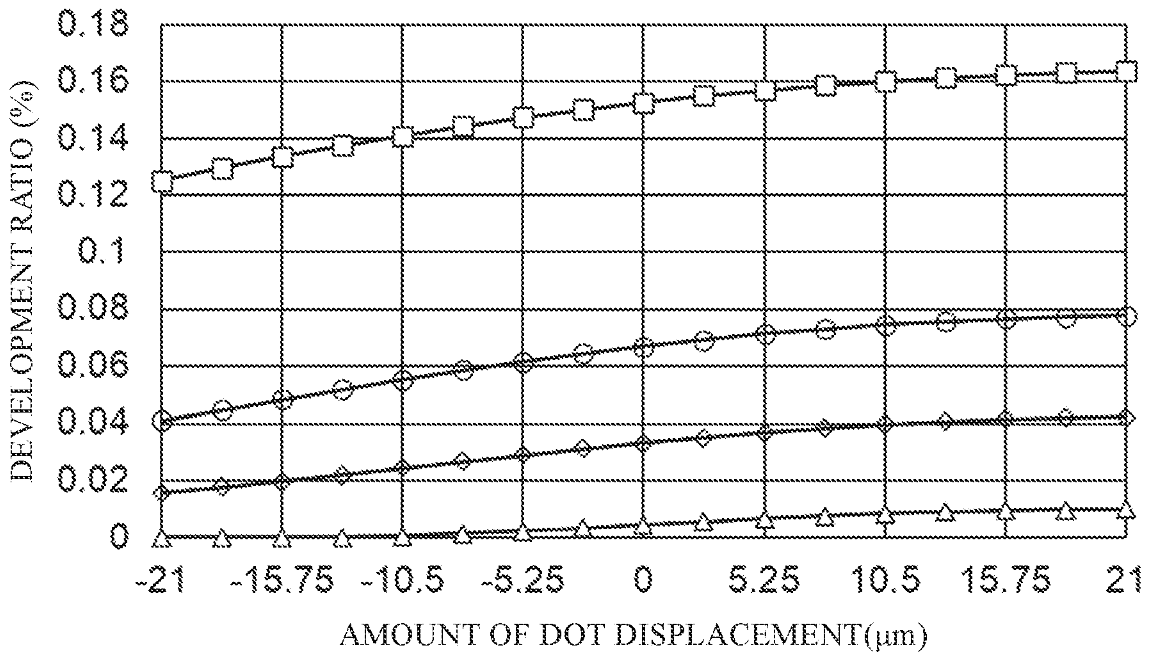
FIG. 23 is a graph showing changes in development ratio in Present Disclosures 4 to 6 of Example and in Comparative Example 2.

In a test, the amount of dot displacement was sequentially changed from −21 μm to 21 μm, and changes in development ratio (%) (when the entire evaluation chart CT was drawn in black, and an image density (ratio of an area occupied by a black part to the entire evaluation chart CT) here was assumed to be one, the ratio of an image density to the evaluation chart CT) were calculated (see FIGS. 21 and 23). The amount of dot displacement was adjusted by changing timing at which the laser diodes LD1 to LD8 emit light. In the amount of dot displacement, a displacement in the main scanning direction was assumed to be +, and a displacement in a direction opposite to the main scanning direction was assumed to be −. A development ratio when no dot displacement occurred (when the amount of dot displacement was 0 μm) was assumed to be a reference value, and changes in the difference value of the development ratio and the reference value when the amount of dot displacement was changed were calculated (see FIGS. 22 and 24).

Figure 24:
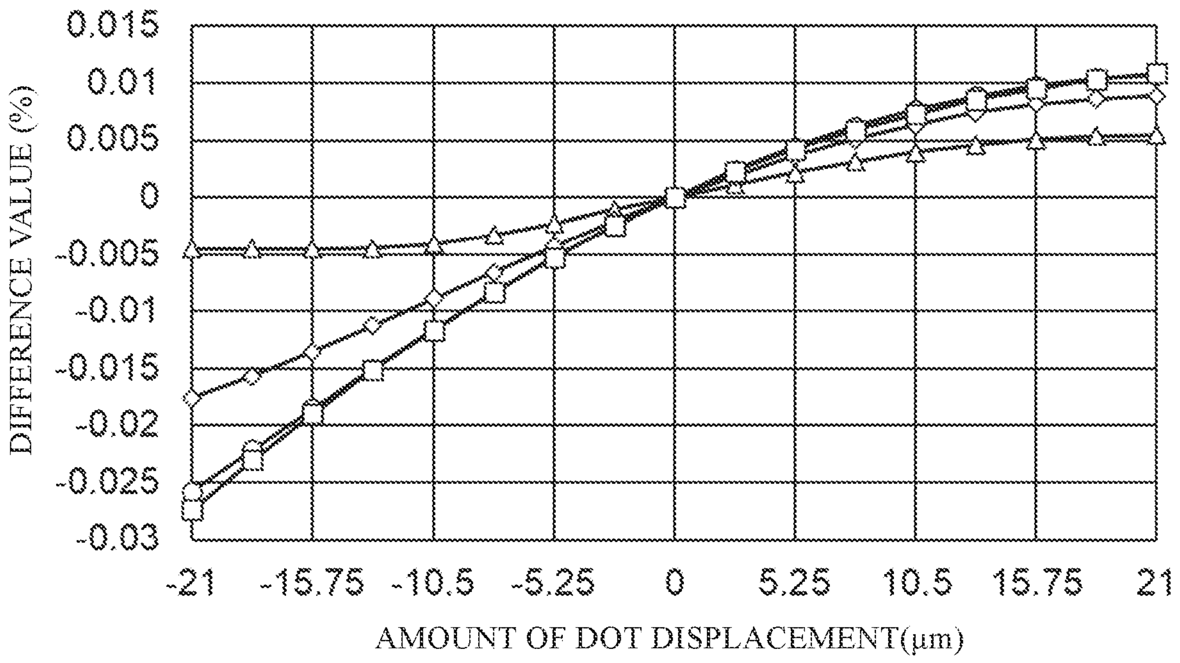
FIG. 24 is a graph showing changes in difference value in Present Disclosures 4 to 6 of Example and in Comparative Example 2.

FIG. 21 is a graph showing changes in development ratio in Present Disclosures 1 to 3 and in Comparative Example 1. FIG. 22 is a graph showing changes in the difference value in Present Disclosures 1 to 3 and in Comparative Example 1. FIG. 23 is a graph showing changes in development ratio in Present Disclosures 4 to 6 and in Comparative Example 2. FIG. 24 is a graph showing changes in the difference value in Present Disclosures 4 to 6 and in Comparative Example 2. In FIGS. 21 to 23, Present Disclosure 1 was indicated by the graph of ●, Present Disclosure 2 was indicated by the graph of ♦, Present Disclosure 3 was indicated by the graph of ■ and Comparative Example 1 was indicated by the graph of ▲. Present Disclosure 4 was indicated by the graph of ○, Present Disclosure 5 was indicated by the graph of ◇, Present Disclosure 6 was indicated by the graph of □ and Comparative Example 2 was indicated by the graph of Δ.

As shown in FIG. 21, the development ratios in Present Disclosures 1 to 3 were changed while being higher than those in Comparative Example 1. As shown in FIG. 22, the rate of change (the magnitude of the slope of the graph in FIG. 22) in the difference values in Present Disclosures 1 to 3 was higher than that in Comparative Example 1. In other words, in the evaluation charts CT of Present Disclosures 1 to 3, as compared with the evaluation chart CT of Comparative Example 1, the rate of change in development ratio when the amount of displacement was changed was high.

As shown in FIG. 23, the development ratios in Present Disclosures 4 to 6 were changed while being higher than those in Comparative Example 2. As shown in FIG. 24, the rate of change (the magnitude of the slope of the graph in FIG. 24) in the difference values in Present Disclosures 4 to 6 was higher than that in Comparative Example 2. In other words, in the evaluation charts CT of Present Disclosures 4 to 6, as compared with the evaluation chart CT of Comparative Example 2, the rate of change in development ratio when the amount of displacement was changed was high.

When FIG. 22 and FIG. 24 were compared, the rate of change (the slope of the graph in FIG. 24) in the difference values in Present Disclosures 4 to 6 was higher than the rate of change (the slope of the graph in FIG. 22) in the difference values in Present Disclosures 1 to 3. In other words, in Present Disclosures 4 to 6, as the amount of dot displacement was increased, the difference values were changed relatively significantly. Hence, a dot displacement was more easily detected.

Therefore, in the evaluation charts CT of Present Disclosures 1 to 6, as compared with the evaluation charts CT of Comparative Examples 1 and 2, image densities were easily detected with the image density sensor 50. When the user or the like made a visual check, in the evaluation charts CT of Present Disclosures 1 to 6, as compared with the evaluation charts CT of Comparative Examples 1 and 2, changes in image density were easily recognized.

The present disclosure can be utilized for an image forming apparatus which adopts a multi-beam method of scanning light beams over a photoconductive drum from a multi-beam laser having a plurality of light emitters. By utilization of the present disclosure, it is possible to provide an image forming apparatus in which the rate of change in image density in an evaluation chart for color displacement correction is increased and thus a dot position displacement in main scanning can be corrected more accurately.

What is claimed is:

1. An image forming apparatus comprising:

a light scanning device that includes: a light source including three or more light-emitting portions which are arranged at a predetermined angle with respect to a main scanning direction in a row at regular intervals; and a polygon mirror which deflects and scans light beams emitted from the light-emitting portions, and that uses the light beams to form an electrostatic latent image on an image carrying member;

a developing portion that forms a toner image by visualizing the electrostatic latent image;

a control portion that controls the light scanning device such that turning on and off of each of the light-emitting portions are switched to form the electrostatic latent image corresponding to image data; and a storage portion that stores a predetermined evaluation chart which is formed by dots drawn with the light beams of the light-emitting portions to determine timing at which each of the light-emitting portions starts writing, wherein the evaluation chart includes:

a first evaluation pattern; and a second evaluation pattern that is arranged parallel to the first evaluation pattern in the main scanning direction or a subscanning direction perpendicular to the main scanning direction, the first evaluation pattern includes a first patch row that is formed by arranging a plurality of first evaluation patches at equal intervals in the subscanning direction, each of the plurality of first evaluation patches includes:

a first dot row in which a smaller number of dots in the subscanning direction than a number of the light-emitting portions are arranged linearly and continuously in the main scanning direction; and a second dot row in which a number of dots adjacent to the first dot row in the subscanning direction are arranged linearly and continuously in the main scanning direction so as to be displaced with respect to the first dot row, the number of dots of the second dot row is equal to or less than a number obtained by subtracting the number of dots of the first dot row in the subscanning direction from the number of the light-emitting portions, a plurality of the first patch rows are arranged at predetermined equal intervals in the main scanning direction to form the first evaluation pattern, the second evaluation pattern includes a second patch row that is formed by arranging, in the subscanning direction, a plurality of second evaluation patches at same intervals as intervals at which the first evaluation patches are arranged parallel to each other, the second evaluation patch is symmetrical with the first evaluation patch in a direction in which the first evaluation pattern and the second evaluation pattern are arranged parallel to each other, a plurality of the second patch rows are arranged at predetermined equal intervals in the main scanning direction to form the second evaluation pattern, at least one of the plurality of first evaluation patches and at least one of the plurality of second evaluation patches are formed by reflecting a part of the light beams emitted from the light-emitting portions off a first deflection surface among a plurality of deflection surfaces of the polygon mirror and reflecting the other light beams off a second deflection surface adjacent to the first deflection surface.

2. The image forming apparatus according to claim 1, wherein the first patch rows are formed at predetermined intervals between the first evaluation patches adjacent to each other in the subscanning direction.

3. The image forming apparatus according to claim 1, wherein in the first patch row, the first evaluation patches are continuously connected in the subscanning direction.

4. The image forming apparatus according to claim 1, wherein a plurality of the evaluation charts are arranged at predetermined intervals in the main scanning direction or the subscanning direction.

5. The image forming apparatus according to claim 1, further comprising:

a density detection mechanism that detects an image density of the toner image which visualizes the evaluation chart, wherein the control portion displaces, based on a difference in the image density between the first dot row and the second dot row detected by the density detection mechanism, timing at which each of the light-emitting portions emits the light beam.

6. The image forming apparatus according to claim 5, wherein a plurality of the evaluation charts are arranged at predetermined intervals in the main scanning direction, the density detection mechanism detects the image density in each of the evaluation charts and the control portion adjusts, based on a result of the detection performed by the density detection mechanism, for each of positions of the evaluation charts, an amount of displacement of the timing at which each of the light-emitting portions emits the light beam.

7. The image forming apparatus according to claim 6, wherein the control portion determines, with a center portion of the first evaluation pattern and the second evaluation pattern adjacent to each other in each of the evaluation charts set to a reference position, the amount of displacement of the timing at which each of the light-emitting portions emits the light beam.

8. The image forming apparatus according to claim 5, further comprising:

an intermediate transfer belt which is arranged opposite the image carrying member and on which the toner image on the image carrying member visualized by the developing portion is primarily transferred, wherein the density detection mechanism detects the image density in the evaluation chart primarily transferred on the intermediate transfer belt.

9. The image forming apparatus according to claim 5, further comprising:

a fixing device that fixes, on a recording medium, the toner image on the image carrying member visualized by the developing portion, wherein the density detection mechanism detects the image density in the evaluation chart fixed on the recording medium.

10. The image forming apparatus according to claim 1, wherein, of the plurality of first evaluation patches, the first evaluation patches other than the first evaluation patches formed by reflecting a part of the light beams emitted from the light-emitting portions off the first deflection surface and reflecting the other light beams off the second deflection surface are formed by reflecting all the light beams emitted from the light-emitting portions off one of a plurality of deflection surfaces of the polygon mirror, and wherein, of the plurality of second evaluation patches, the second evaluation patches other than the second evaluation patches formed by reflecting a part of the light beams emitted from the light-emitting portions off the first deflection surface and reflecting the other light beams off the second deflection surface are formed by reflecting all the light beams emitted from the light-emitting portions off one of a plurality of deflection surfaces of the polygon mirror.

11. The image forming apparatus according to claim 1, wherein each of the plurality of first evaluation patches and each of the plurality of second evaluation patches are formed by reflecting a part of the light beams emitted from the light-emitting portions off the first deflection surface and reflecting the other light beams the second deflection surface.

12. The image forming apparatus according to claim 1, wherein the evaluation chart includes:

an identical surface first evaluation pattern that is the first evaluation pattern including the first evaluation patch which is formed by reflecting all the light beams emitted from the light-emitting portions off one of the plurality of deflection surfaces;

a different scanning surface first evaluation pattern that is the first evaluation pattern including the first evaluation patch which is formed by reflecting a part of the light beams emitted from the light-emitting portions off the first deflection surface and reflecting the other light beams off the second deflection surface;

an identical surface second evaluation pattern that is the second evaluation pattern including the second evaluation patch which is formed by reflecting all the light beams emitted from the light-emitting portions of the one or another of the plurality of deflection surfaces; and a different scanning surface second evaluation pattern that is the second evaluation pattern including the second evaluation patch which is formed by reflecting a part of the light beams emitted from the light-emitting portions off the first deflection surface among the plurality of deflection surfaces and reflecting the other light beams off the second deflection surface adjacent to the first deflection surface, wherein the control portion changes timing at which each of the light-emitting portions emits the light beam to a first setting value and to a second setting value so as to control formation of a pair of the evaluation charts, the control portion calculates a first noise value that is calculated based on: a first density difference which is a difference in development density between the identical surface first evaluation pattern and the identical surface second evaluation pattern in the evaluation chart formed using the first setting value; and a second density difference which is a difference in development density between the different scanning surface first evaluation pattern and the different scanning surface second evaluation pattern in the evaluation chart formed using the first setting value and a second noise value that is calculated based on the first density difference and the second density difference in the evaluation chart formed using the second setting value and the control portion calculates, based on the first noise value and the second noise value, an amount of dot displacement in the adjacent light-emitting portions in the main scanning direction.

* * * * *